United States Patent
Kishioka et al.

(10) Patent No.: US 8,945,710 B2
(45) Date of Patent: Feb. 3, 2015

(54) OPTICAL PRESSURE-SENSITIVE ADHESIVE SHEET

(75) Inventors: Hiroaki Kishioka, Ibaraki (JP); Hiroaki Fumoto, Ibaraki (JP); Masayuki Okamoto, Ibaraki (JP); Masahito Niwa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 14 days.

(21) Appl. No.: 13/583,079

(22) PCT Filed: Mar. 2, 2011

(86) PCT No.: PCT/JP2011/054694
§ 371 (c)(1),
(2), (4) Date: Sep. 6, 2012

(87) PCT Pub. No.: WO2011/111575
PCT Pub. Date: Sep. 15, 2011

(65) Prior Publication Data
US 2012/0329970 A1   Dec. 27, 2012

(30) Foreign Application Priority Data

Mar. 10, 2010  (JP) ................. 2010-053187
Mar. 10, 2010  (JP) ................. 2010-053606

(51) Int. Cl.
*C09J 7/02* (2006.01)
*C09J 133/16* (2006.01)
(Continued)

(52) U.S. Cl.
CPC ........... *C09J 133/066* (2013.01); *B32B 7/12* (2013.01); *B32B 27/36* (2013.01); *C09J 7/0246* (2013.01);
(Continued)

(58) Field of Classification Search
CPC ............ C09J 2201/606; C09J 7/0217; H01J 2211/446
USPC ................................ 428/355 AC
See application file for complete search history.

(56) References Cited

U.S. PATENT DOCUMENTS 7,097,903 B2   8/2006  Kishioka et al.
2003/0232192 A1  12/2003  Kishioka et al.
(Continued)

FOREIGN PATENT DOCUMENTS

JP   09-059580 A    3/1997
JP   2003-238915 A  8/2003
(Continued)

OTHER PUBLICATIONS

International Search Report dated Jun. 7, 2011, issued for PCT/JP2011/054694.
(Continued)

*Primary Examiner* — Vu A Nguyen
(74) *Attorney, Agent, or Firm* — Edwards Wildman Palmer LLP; James E. Armstrong, IV

(57) ABSTRACT

Provided is an optical pressure-sensitive adhesive sheet which excels in whitening resistance and high-temperature bonding reliability and exhibits superior bump absorptivity. The optical pressure-sensitive adhesive sheet according to the present invention includes an acrylic pressure-sensitive adhesive layer and has a moisture content of 0.65 percent by weight or more after storage in an environment of 60° C. and 95 percent relative humidity for 120 hours, in which the acrylic pressure-sensitive adhesive layer contains an acrylic polymer and has a storage shear modulus at 23° C. of from $0.8 \times 10^5$ to $5.0 \times 10^5$ Pa, and the acrylic polymer is formed from, as an essential monomer component, a monomer that will form a homopolymer having a glass transition temperature of $-10°$ C. or higher.

12 Claims, 3 Drawing Sheets

(51) Int. Cl.
*C09J 133/24* (2006.01)
*C09J 133/06* (2006.01)
*B32B 7/12* (2006.01)
*B32B 27/36* (2006.01)
*G02F 1/1335* (2006.01)

(52) U.S. Cl.
CPC ......... *B32B 2307/202* (2013.01); *G02F 1/1335* (2013.01); *G02F 2202/28* (2013.01); *C09J 2201/622* (2013.01); *C09J 2433/00* (2013.01)
USPC .................................................. 428/355 AC

(56) References Cited

U.S. PATENT DOCUMENTS

| | | |
|---|---|---|
| 2004/0191509 A1 | 9/2004 | Kishioka et al. |
| 2005/0202238 A1 | 9/2005 | Kishioka et al. |
| 2007/0196646 A1* | 8/2007 | Matano et al. .......... 428/355 AC |
| 2007/0238805 A1* | 10/2007 | Maeda et al. ................. 522/109 |
| 2009/0104445 A1 | 4/2009 | Inoue et al. |

FOREIGN PATENT DOCUMENTS

| | | |
|---|---|---|
| JP | 2003-342542 A | 12/2003 |
| JP | 2004-133021 A | 4/2004 |
| JP | 2004-231723 A | 8/2004 |
| JP | 2004-263084 A | 9/2004 |
| JP | 2005-255877 A | 9/2005 |
| JP | 2007-246879 A | 9/2007 |
| JP | 2007-264092 A | 10/2007 |
| JP | 2009-235205 A | 10/2009 |
| JP | 2009-299047 A | 12/2009 |
| JP | 2011-099078 A | 5/2011 |
| WO | WO-2009/126532 A2 | 10/2009 |

OTHER PUBLICATIONS

Notification of the First Office Action dated Jul. 1, 2013, issued for the counterpart Chinese patent No. 201180013232.5 and English translation thereof.
Notification of First Office Action dated Jul. 2, 2013, issued for the counterpart Chinese patent application No. 201180013202.4 and English translation thereof.
Notification of the Second Office Action issued in corresponding Chinese Patent Application No. CN201180013202.4, dated Feb. 14, 2014.
Third Office Action dated May 23, 2014, issued for the corresponding Chinese patent application No. 201180013202.4.
Notification of Second Office Action issued in a related Chinese Patent Application No. CN201180013232.5, dated May 6, 2014.
Notification of Reasons for Refusal, issued in corresponding Japanese Patent Application No. JP 2012-504412, dated Nov. 4, 2014.
Notification of Reasons for Refusal, issued in related Japanese Patent Application No. JP 2012-504413, dated Nov. 4, 2014.

* cited by examiner

OPTICAL PRESSURE-SENSITIVE ADHESIVE SHEET

CROSS REFERENCE TO RELATED APPLICATIONS

This application is related to co-pending application: "OPTICAL PRESSURE-SENSITIVE ADHESIVE SHEET" filed even date herewith in the names of Hiroaki Kishioka, Hiroaki Fumoto, Masayuki Okamoto and Masahito Niwa as a national phase entry of PCT/JP2011/054700, which application is assigned to the assignee of the present application and is incorporated by reference herein.

TECHNICAL FIELD

The present invention relates to optical pressure-sensitive adhesive sheets which are used typically for the lamination of optical members (optical elements) and for the production of optical products.

BACKGROUND ART

Liquid crystal displays (LCDs) and other display devices, as well as touch panels and other input devices to be used in combination with the display devices have been recently widely employed in various areas. Transparent pressure-sensitive adhesive sheets (pressure-sensitive adhesive tapes) are used for the lamination of optical members typically in the production of such display devices and input devices. For example, transparent pressure-sensitive adhesive sheets are used for the lamination of touch panels with various display devices or optical members (e.g., protective plates) and for the lamination of constitutional members of touch panels with each other (see, for example, Patent Literature (PTL) 1, PTL 2, PTL 3, and PTL 4).

Pressure-sensitive adhesive sheets to be used in these devices should exhibit not only transparency in an ordinary state but also sufficient properties as pressure-sensitive adhesive sheets in a variety of environments with expanding uses of the display devices and input devices. Typically, they should have a property as not to become cloudy (whitened) due to moisture (high humidity) (this property is hereinafter also referred to as "whitening resistance") and, in particular, should be resistant to whitening even when the environment is changed from a high temperature and high humidity environment (hot and humid environment) to a room-temperature environment. They also require bonding reliability at high temperatures (high-temperature bonding reliability). Specifically, they require excellent tackiness at high temperatures and such a property as not suffer from blistering and separation at high temperatures (hereinafter this property is also referred to as "blistering/separation resistance").

There is known a pressure-sensitive adhesive having high transparency and excellent whitening resistance (see PTL 5). However, a pressure-sensitive adhesive sheet formed from the pressure-sensitive adhesive, when exposed to high temperatures, has an insufficient adhesive strength and suffers from blistering and separation, thus being inferior in high-temperature bonding reliability. Specifically, under present circumstances, a pressure-sensitive adhesive sheet having both whitening resistance and high-temperature bonding reliability at certain level has not yet been obtained.

Of the display devices and input devices, those including members having steps or bumps such as printed-ink bumps have increased in number. For example, cellular phones employ touch panels having members with frame-like printed regions. Pressure-sensitive adhesive sheets to be used in such applications require not only a capability of affixing members but also a capability of filling in printed-ink bumps, namely, excellent bump absorptivity (bump conformability).

CITATION LIST

Patent Literature

PTL 1: Japanese Unexamined Patent Application Publication (JP-A) No. 2003-238915
PTL 2: JP-A No. 2003-342542
PTL 3: JP-A No. 2004-231723
PTL 4: JP-A No. 2005-255877
PTL 5: JP-A No. 2004-263084

SUMMARY OF INVENTION

Technical Problem

Accordingly, an object of the present invention is to provide an optical pressure-sensitive adhesive sheet which excels in whitening resistance and high-temperature bonding reliability and further has satisfactory bump absorptivity.

Solution to Problem

After intensive investigations, the present inventors have found that a specific pressure-sensitive adhesive sheet can serve as an optical pressure-sensitive adhesive sheet which excels in whitening resistance and high-temperature bonding reliability and also has satisfactory bump absorptivity, in which the pressure-sensitive adhesive sheet has an acrylic pressure-sensitive adhesive layer and has a moisture content after storage in an environment of 60° C. and 95 percent relative humidity for 120 hours controlled within a specific range, and the acrylic pressure-sensitive adhesive layer contains an acrylic polymer formed from specific monomer components and has a storage shear modulus at 23° C. controlled within a specific range. The present invention has been made based on these findings.

Specifically, the present invention provides an optical pressure-sensitive adhesive sheet which includes an acrylic pressure-sensitive adhesive layer and has a moisture content of 0.65 percent by weight or more after storage in an environment of 60° C. and 95 percent relative humidity for 120 hours, in which the acrylic pressure-sensitive adhesive layer contains an acrylic polymer and has a storage shear modulus at 23° C. of from $0.8 \times 10^5$ to $5.0 \times 10^5$ Pa, and the acrylic polymer is formed from, as an essential monomer component, a monomer that will form a homopolymer having a glass transition temperature of $-10°$ C. or higher.

In the optical pressure-sensitive adhesive sheet, the total amount, as measured through ion chromatography, of acrylic acid ions and methacrylic acid ions extracted from the optical pressure-sensitive adhesive sheet with pure water under conditions of 100° C. for 45 minutes may be 20 ng/cm$^2$ or less per unit area of the acrylic pressure-sensitive adhesive layer.

In the optical pressure-sensitive adhesive sheet, the acrylic pressure-sensitive adhesive layer may have a gel fraction of from 40% to 95%.

The optical pressure-sensitive adhesive sheet, when stored in an environment of 60° C. and 95 percent relative humidity for 250 hours and recovered to an environment of 23° C. and 50 percent relative humidity, may have differences of each less than 5% between a haze immediately after the recovery and a haze before the storage in an environment of 60° C. and 95 percent relative humidity for 250 hours, between a haze 30 minutes after the recovery and the haze before the storage, between a haze one hour after the recovery and the haze before the storage, between a haze 3 hours after the recovery and the haze before the storage, and between a haze 6 hours after the recovery and the haze before the storage, respectively.

In the optical pressure-sensitive adhesive sheet, the acrylic polymer may be formed from monomer components containing a hydroxyl-containing (meth)acrylic ester in a content of from 5 to 35 percent by weight based on the total amount (100 percent by weight) of the monomer components constituting the acrylic polymer.

In the optical pressure-sensitive adhesive sheet, the acrylic polymer may be formed from monomer components containing an amide compound in a content of from 5 to 20 percent by weight based on the total amount (100 percent by weight) of the monomer components constituting the acrylic polymer, in which the amide compound has a polymerizable functional group and is represented by following Formula (I):

[Chem. 1]

$$R^1—CO—NR^2R^3 \qquad (I)$$

wherein $R^1$, $R^2$, and $R^3$ are each independently hydrogen atom or a monovalent organic group, or arbitrary two of $R^1$, $R^2$, and $R^3$ are bound to each other to form a cyclic structure, and the other one is a monovalent organic group.

Advantageous Effects of Invention

The optical pressure-sensitive adhesive sheet according to the present invention, as having the configuration, exhibits excellent tackiness and blistering/separation resistance under high-temperature conditions and thus excels in high-temperature bonding reliability. The optical pressure-sensitive adhesive sheet according to the present invention also excels in whitening resistance and thereby does not impair the appearances of optical members and optical products obtained by the use of the sheet. Particularly when the optical products (optical members) are display devices (display members), the sheet does not lower the visibility of displays of them. In addition, the sheet also has satisfactory bump absorptivity and, even when applied typically to optical members having bumps or steps, can fill in such bumps and does not cause bubbles in the bump regions. Thus, the optical pressure-sensitive adhesive sheet according to the present invention has the above properties required for such optical uses at high levels. The optical pressure-sensitive adhesive sheet according to the present invention, when used, gives products with beautiful finish, because the sheet does not cause phenomena such as the formation of bubbles and gaps, and whitening, which phenomena can adversely affect the visibility and appearances of the products (e.g., touch panels).

DESCRIPTION OF EMBODIMENTS

Figure 1:
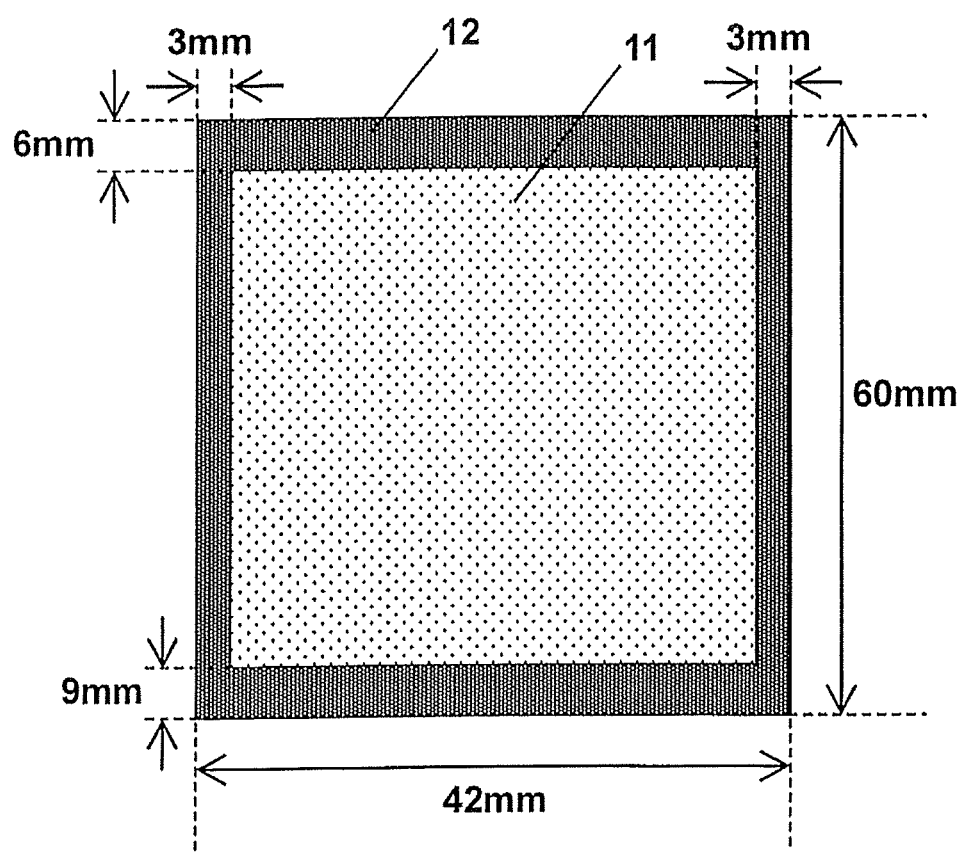
FIG. 1 is a schematic diagram (plan view seen from a black printed layer side) of a poly(ethylene terephthalate) (PET) film having a black printed layer, which is used in the evaluation of bump absorptivity in working examples.

The present invention will be illustrated in detail with reference to embodiments thereof below.

An optical pressure-sensitive adhesive sheet according to an embodiment of the present invention (hereinafter also simply referred to as a "pressure-sensitive adhesive sheet of the present invention") includes an acrylic pressure-sensitive adhesive layer and has a moisture content of 0.65 percent by weight or more after storage in an environment of 60° C. and 95 percent relative humidity for 120 hours, in which the acrylic pressure-sensitive adhesive layer contains an acrylic polymer and has a storage shear modulus at 23° C. of from $0.8 \times 10^5$ to $5.0 \times 10^5$ Pa, and the acrylic polymer is formed from, as an essential monomer component, a monomer that will form a homopolymer having a glass transition temperature of −10° C. or higher. This acrylic pressure-sensitive adhesive layer is hereinafter also referred to as an "acrylic pressure-sensitive adhesive layer in the present invention."

The pressure-sensitive adhesive sheet of the present invention may be a double-coated pressure-sensitive adhesive sheet having adhesive faces (surfaces of the pressure-sensitive adhesive layer) on both sides of the sheet, or a single-coated pressure-sensitive adhesive sheet having an adhesive face on only one side of the sheet. Among them, the pressure-sensitive adhesive sheet of the present invention is preferably a double-coated pressure-sensitive adhesive sheet for the lamination of two members. As used herein the term "pressure-sensitive adhesive sheet" also includes one in the form of a tape, namely, a "pressure-sensitive adhesive tape." The surface(s) of a pressure-sensitive adhesive layer(s) in the pressure-sensitive adhesive sheet of the present invention is also referred to as an "adhesive face(s)."

The pressure-sensitive adhesive sheet of the present invention may be a so-called "substrate-less type" pressure-sensitive adhesive sheet having no substrate (substrate layer) (hereinafter also referred to as "substrate-less pressure-sensitive adhesive sheet"), or a substrate-supported type pressure-sensitive adhesive sheet. Examples of the substrate-less pressure-sensitive adhesive sheet include a double-coated pressure-sensitive adhesive sheet including the acrylic pressure-sensitive adhesive layer in the present invention alone; and a double-coated pressure-sensitive adhesive sheet including the acrylic pressure-sensitive adhesive layer in the present invention and a pressure-sensitive adhesive layer other than the acrylic pressure-sensitive adhesive layer in the present invention (hereinafter also referred to as "other pressure-sensitive adhesive layer"). The substrate-supported pressure-sensitive adhesive sheet is not limited, as long as having a substrate and, on at least one side thereof, an acrylic pressure-sensitive adhesive layer in the present invention. Of these pressure-sensitive adhesive sheets, substrate-less pressure-sensitive adhesive sheets (substrate-less double-coated pressure-sensitive adhesive sheets) are preferred, of which a substrate-less double-coated pressure-sensitive adhesive sheet including the acrylic pressure-sensitive adhesive layer in the present invention alone is more preferred, for allowing the pressure-sensitive adhesive sheet to have a smaller thickness and to have better optical properties such as transparency. The "substrate (substrate layer)" does not include a separator (release liner) which will be removed upon use (application) of the pressure-sensitive adhesive sheet.

[Acrylic Pressure-sensitive Adhesive Layer in Present Invention]

The acrylic pressure-sensitive adhesive layer in the present invention contains an acrylic polymer as a principal component. The acrylic polymer is not limited, as long as being an acrylic polymer formed from a monomer which will form a homopolymer having a glass transition temperature of −10° C. or higher (hereinafter also referred to as a "monomer forming a homopolymer with a Tg of −10° C. or higher") as an essential monomer component. The acrylic polymer is contained in a content of preferably 65 percent by weight or more (e.g., from 65 to 100 percent by weight) and more preferably from 70 to 99.999 percent by weight in the acrylic pressure-sensitive adhesive layer in the present invention (100 percent by weight), from the viewpoints of adhesive properties at high temperatures and appearance properties under hot and humid conditions.

Though the procedure may vary depending on a method for forming the pressure-sensitive adhesive layer and is not limited, the acrylic pressure-sensitive adhesive layer in the present invention may be formed from a pressure-sensitive adhesive composition including the acrylic polymer as an essential component, or from a pressure-sensitive adhesive composition including, as an essential component, a mixture of monomers constituting the acrylic polymer (hereinafter also referred to as a "monomer mixture") or a partial polymer of the monomer mixture. Though not limited, the former is typified by a so-called solvent-borne pressure-sensitive adhesive composition; whereas the latter is typified by a so-called active-energy-ray-curable pressure-sensitive adhesive composition. The pressure-sensitive adhesive compositions may further contain any of crosslinking agents and other various additives according to necessity.

As used herein the term "pressure-sensitive adhesive composition" also includes a "composition for the formation of a pressure-sensitive adhesive layer." Also as used herein the term "monomer mixture" refers to a mixture composed of only a monomer component or components constituting the acrylic polymer. The term "partial polymer" refers to a composition corresponding to the monomer mixture, except with one or more of constitutional components of the monomer mixture being partially polymerized.

The acrylic polymer is a polymer formed from (constituted by) an acrylic monomer as an essential monomer component and is an acrylic polymer formed from, as an essential monomer component, a monomer forming a homopolymer with a Tg of −10° C. or higher.

Though not limited, the acrylic polymer is preferably a polymer formed typically from monomer components including a polar-group-containing monomer, and at least one of a (meth)acrylic alkyl ester whose alkyl moiety being a linear or branched-chain alkyl group and/or a (meth)acrylic alkoxyalkyl ester. Such monomer components constituting the acrylic polymer may further include any of other copolymerizable monomers. As used herein the term "(meth)acrylic" refers to "acrylic" and/or "methacrylic" (either one or both of "acrylic" and "methacrylic"), and the same is true for other descriptions.

Examples of the (meth)acrylic alkyl ester whose alkyl moiety being a linear or branched-chain alkyl group (hereinafter also simply referred to as "(meth)acrylic alkyl ester") include (meth)acrylic alkyl esters whose alkyl moiety having 1 to 20 carbon atoms, such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Each of the (meth)acrylic alkyl esters may be used alone or in combination. AMong them, (meth)acrylic alkyl esters whose alkyl moiety having 3 to 14 carbon atoms are preferred, of which (meth)acrylic alkyl esters whose alkyl moiety having 3 to 10 carbon atoms are more preferred, acrylic alkyl esters whose alkyl moiety having 3 to 10 carbon atoms are furthermore preferred, and 2-ethylhexyl acrylate (2EHA) and n-butyl acrylate (BA) are particularly preferred.

The (meth)acrylic alkoxyalkyl ester [alkoxyalkyl (meth)acrylate] is exemplified by, but is not limited to, 2-methoxyethyl (meth)acrylate, 2-ethoxyethyl (meth)acrylate, methoxytriethylene glycol (meth)acrylate, 3-methoxypropyl (meth)acrylate, 3-ethoxypropyl (meth)acrylate, 4-methoxybutyl (meth)acrylate, and 4-ethoxybutyl (meth)acrylate. Each of the (meth)acrylic alkoxyalkyl esters may be used alone or in combination. Among them, acrylic alkoxyalkyl esters [alkoxyalkyl acrylates] are preferred, of which 2-methoxyethyl acrylate (MEA) is more preferred.

From the viewpoint of adhesiveness at low temperatures, the (meth)acrylic alkyl ester and/or (meth)acrylic alkoxyalkyl ester is contained in a content of preferably 30 percent by weight or more (e.g., from 30 to 99 percent by weight), more preferably from 50 to 99 percent by weight, and furthermore preferably from 50 to 95 percent by weight, based on the total amount (100 percent by weight) of the monomer components constituting the acrylic polymer. When the monomer components constituting the acrylic polymer include both the (meth)acrylic alkyl ester and (meth)acrylic alkoxyalkyl ester, the total sum of the content of the (meth)acrylic alkyl ester and the content of the (meth)acrylic alkoxyalkyl ester (total content) preferably falls within the range.

When monomer components constituting the acrylic polymer include both a (meth)acrylic alkyl ester and a (meth)acrylic alkoxyalkyl ester, the content of the (meth)acrylic alkoxyalkyl ester is preferably from 1 to 75 percent by weight and more preferably from 1 to 50 percent by weight, based on the total content (100 percent by weight) of the two components.

The polar-group-containing monomer is exemplified by hydroxyl-containing monomers such as 2-hydroxyethyl (meth)acrylate, 3-hydroxypropyl (meth)acrylate, 4-hydroxybutyl (meth)acrylate, 6-hydroxyhexyl (meth)acrylate, vinyl alcohol, and allyl alcohol; amido-containing monomers such as (meth)acrylamide, N,N-dimethyl(meth)acrylamide, N-methylol(meth)acrylamide, N-methoxymethyl(meth)acrylamide, N-butoxymethyl(meth)acrylamide, and N-hydroxyethyl(meth)acrylamide; amino-containing monomers such as aminoethyl (meth)acrylate, dimethylaminoethyl (meth)acrylate, and t-butylaminoethyl (meth)acrylate; epoxy-containing monomers such as glycidyl (meth)acrylate and methylglycidyl (meth)acrylate; cyano-containing monomers such as acrylonitrile and methacrylonitrile; heterocycle-containing vinyl monomers such as N-vinyl-2-pyrrolidone, (meth) acryloylmorpholine, N-vinylpiperidone, N-vinylpiperazine, N-vinylpyrrole, and N-vinylimidazole; sulfo-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. Each of the polar-group-containing monomers may be used alone or in combination.

Multifunctional monomers may be used as the other copolymerizable monomers. Exemplary multifunctional monomers include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylates, polyester acrylates, and urethane acrylates. Each of the multifunctional monomers may be used alone or in combination. Among them, dipentaerythritol hexaacrylate is preferably used for better adhesiveness at high temperatures.

The multifunctional monomer is contained in a content of preferably 0.5 percent by weight or less (e.g., from 0 to 0.5 percent by weight) and more preferably from 0 to 0.1 percent by weight, based on the total amount (100 percent by weight) of the monomer components constituting the acrylic polymer. Control of the multifunctional monomer content to 0.5 percent by weight or less allows the sheet to have good balance between the high-temperature bonding reliability and the bump absorptivity. When a crosslinking agent is used, the multifunctional monomer does not have to be used, but, when no crosslinking agent is used, the multifunctional monomer is preferably used in a content of from 0.001 to 0.5 percent by weight and more preferably from 0.002 to 0.1 percent by weight.

Examples of the other copolymerizable monomer than the multifunctional monomers include (meth)acrylic esters other than the aforementioned (meth)acrylic alkyl esters, (meth)acrylic alkoxyalkyl esters, polar-group-containing monomers, and multifunctional monomers, which are typified by (meth)acrylic esters having an alicyclic hydrocarbon group, such as cyclopentyl (meth)acrylate, cyclohexyl (meth)acrylate, and isobornyl (meth)acrylate, and (meth)acrylic esters having an aromatic hydrocarbon group, such as phenyl (meth)acrylate, phenoxyethyl (meth)acrylate, and benzyl (meth)acrylate; vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride.

Among the monomer components, the monomer forming a homopolymer with a Tg of −10° C. or higher should be employed as an essential monomer component for constituting the acrylic polymer constituting the acrylic pressure-sensitive adhesive layer in the present invention. The monomer forming a homopolymer with a Tg of −10° C. or higher has only to form a homopolymer having a glass transition temperature (Tg) of −10° C. or higher and may be suitably chosen from among the monomers ((meth)acrylic alkyl esters, (meth)acrylic alkoxyalkyl esters, polar-group-containing monomers, and other copolymerizable monomers).

The monomer forming a homopolymer with a Tg of −10° C. or higher forms a homopolymer having a glass transition temperature (Tg) of −10° C. or higher (e.g., from −10° C. to 250° C.), preferably from −10° C. to 230° C. and more preferably from −10° C. to 200° C. A monomer forming a homopolymer with a Tg of −10° C. or higher, when used, helps the pressure-sensitive adhesive layer to have better bonding reliability at high temperatures. In contrast, a monomer forming a homopolymer with a Tg of 250° C. or lower, when used, does not cause excessively high hardness (rigidity) of the pressure-sensitive adhesive layer, thus contributing to better bump absorptivity.

As used herein the term "glass transition temperature (Tg) of a homopolymer formed" (hereinafter also simply referred to as "glass transition temperature (Tg) of its homopolymer") refers to "the glass transition temperature (Tg) of a homopolymer formed from the monomer," and specific values of the glass transition temperature (Tg) are listed in "Polymer Handbook" (Third Edition, John Wiley & Sons, Inc, 1987). A glass transition temperature (Tg) of a homopolymer formed from a monomer not listed in the literature refers a value determined typically by the following measurement method (see JP-A No. 2007-51271). Specifically, 100 parts by weight of the monomer, 0.2 part by weight of 2,2'-azobisisobutyronitrile, and 200 parts by weight of ethyl acetate as a polymerization solvent are placed in a reactor equipped with a thermometer, a stirrer, a nitrogen inlet tube, and a reflux condenser, followed by stirring for one hour with the introduction of nitrogen gas. After removing oxygen from the polymerization system in this manner, the temperature is raised to 63° C., followed by a reaction for 10 hours. Next, the reaction mixture is cooled to room temperature and thereby yields a homopolymer solution having a solids concentration of 33 percent by weight. Next, the homopolymer solution is cast and applied onto a separator, dried, and thereby yields a test sample (sheet-like homopolymer) having a thickness of about 2 mm. The test sample is blanked into a disc having a diameter of 7.9 mm, held between parallel plates, and a viscoelasticity of the test sample is measured in a shear mode using a viscoelasticity tester (rheometer) (ARES supplied by Rheometric Scientific F.E. Ltd. (now TA Instruments)), while varying the temperature from −70° C. to 150° C. at a rate of temperature rise of 5° C. per minute with the application of a shearing strain at a frequency of 1 Hz, and a peak-top temperature of tan δ (loss tangent) is defined as a glass transition temperature Tg of the homopolymer.

The monomer forming a homopolymer with a Tg of −10° C. or higher is not limited, as long as being capable of forming a homopolymer having a Tg of −10° C. or higher, but is exemplified by isobornyl (meth)acrylate, N-vinyl-2-pyrrolidone, N-hydroxyethyl(meth)acrylamide, and methyl methacrylate. Each of such monomers forming a homopolymer with a Tg of −10° C. or higher may be used alone or in combination. Among them, preferred are isobornyl acrylate (IBXA) (forming a homopolymer with a Tg of 94° C.), N-vinyl-2-pyrrolidone (NVP) (forming a homopolymer with a Tg of 54° C.), and N-hydroxyethylacrylamide (N-(2-hydroxyethyl)acrylamide) (HEAA) (forming a homopolymer with a Tg of 98° C.) for better bonding reliability at high temperatures. Of these, N-vinyl-2-pyrrolidone and/or N-hydroxyethylacrylamide, when used, helps the pressure-sensitive adhesive sheet to have better bonding reliability at high temperatures and to effectively have a higher moisture content mentioned later, thus being desirable.

Though not critical, the monomer forming a homopolymer with a Tg of −10° C. or higher is contained in a content of preferably 5 percent by weight or more (e.g., from 5 to 60 percent by weight), more preferably from 5 to 50 percent by weight, furthermore preferably from 5 to 40 percent by weight, and still more preferably from 8 to 40 percent by weight, based on the total monomer components (total amount of all the monomer components; 100 percent by weight) constituting the acrylic polymer. The monomer forming a homopolymer with a Tg of −10° C. or higher, when contained in a content of 5 percent by weight or more, contributes to better bonding reliability at high temperatures. In contrast, the monomer, when contained in a content of 60 percent by weight or less, does not cause excessively high rigidity of the acrylic pressure-sensitive adhesive layer, thus contributing to better bump absorptivity. When two or more different monomers each forming a homopolymer with a Tg of −10° C. or higher are used, the total content of the monomers forming a homopolymer with a Tg of −10° C. or higher preferably falls within the range.

In addition, the acrylic polymer is preferably a polymer formed from monomer components including a hydrophilic monomer. The hydrophilic monomer, when used as a monomer component, may help the pressure-sensitive adhesive sheet to easily have a higher moisture content mentioned below, thus contributing to better whitening resistance.

The hydrophilic monomer is not limited, as long as being a monomer having high affinity for water, but may generally be selected from the aforementioned polar-group-containing monomers. Among them, a hydroxyl-containing (meth) acrylic ester and an amide compound are preferred as the hydrophilic monomer for effectively helping the pressure-sensitive adhesive sheet to have a higher moisture content.

The hydroxyl-containing (meth)acrylic ester is not limited, as long as being a (meth)acrylic ester having a hydroxyl group, but is typified by 2-hydroxyethyl (meth)acrylate, 2-hydroxypropyl (meth)acrylate, 3-hydroxypropyl (meth) acrylate, 4-hydroxybutyl (meth)acrylate, and 6-hydroxyhexyl (meth)acrylate. Each of the hydroxyl-containing (meth)acrylic esters may be used alone or in combination. Among them, 2-hydroxyethyl acrylate (2HEA), 4-hydroxybutyl acrylate, and 2-hydroxypropyl acrylate are preferred for better bonding reliability at high temperatures.

Though not critical, the hydroxyl-containing (meth)acrylic ester is contained in a content of preferably from 5 to 35 percent by weight, more preferably from 10 to 30 percent by weight, and furthermore preferably from 15 to 30 percent by weight, based on the total monomer components (total amount of all the monomer components; 100 percent by weight) constituting the acrylic polymer. The hydroxyl-containing (meth)acrylic ester, when contained in a content of 5 percent by weight or more, may help the pressure-sensitive adhesive sheet to easily have a higher moisture content as mentioned below, thus contributing to better whitening resistance. In contrast, the hydroxyl-containing (meth)acrylic ester, when contained in a content of 35 percent by weight or less, does not cause the pressure-sensitive adhesive sheet to have an excessively small cohesive force at high humidity.

The amide compound is a monomer having a polymerizable functional group and being represented by following Formula (I):
[Chem. 2]

$$R^1\text{—CO—NR}^2R^3 \quad (I)$$

In Formula (I), $R^1$, $R^2$, and $R^3$ are each independently (namely, $R^1$, $R^2$, and $R^3$ may be the same as or different from one another and represent) hydrogen atom or a monovalent organic group, or arbitrary two of $R^1$, $R^2$, and $R^3$ are bound to each other to form a cyclic structure, and the other one is a monovalent organic group.

A preferred example of such amide compounds represented by Formula (I) and having a polymerizable functional group is a compound of Formula (I) in which $R^1$ is vinyl group or isopropenyl group, namely, an amide compound represented by following Formula (II):
[Chem. 3]

$$CH_2\text{=}C(R^4)\text{—CO—NR}^5R^6 \quad (II)$$

In Formula (II), $R^4$ is hydrogen atom or methyl group; and $R^5$ and $R^6$ are each independently hydrogen atom or a monovalent organic group, or $R^5$ and $R^6$ are bound to each other to form a cyclic structure.

Examples of the monovalent organic group include, but are not limited to, linear or branched-chain alkyl groups such as methyl group, ethyl group, propyl group, and butyl group; hydroxyalkyl groups such as methylol group and hydroxyethyl group; and alkoxyalkyl groups such as methoxy group and ethoxy group.

The cyclic structure (cyclic structure formed by $R^5$ and $R^6$ bound to each other) may be typified by, but is not limited to, heterocyclic structures each having at least one nitrogen atom, such as morpholine ring, piperidine ring, pyrrolidine ring, and piperazine ring.

When $R^5$ and $R^6$ are each independently hydrogen atom or a monovalent organic group, exemplary amide compounds represented by Formula (II) include (meth)acrylamide; N-alkyl(meth)acrylamides such as N,N-dimethyl(meth)acrylamide and N,N-diethyl(meth)acrylamide; N-alkoxyalkyl (meth)acrylamides such as N-methoxymethyl(meth)acrylamide and N-butoxymethyl(meth)acrylamide; and N-hydroxyalkyl(meth)acrylamides such as N-methylol (meth)acrylamide and N-hydroxyethyl(meth)acrylamide.

When $R^5$ and $R^6$ are bound to each other to form a cyclic structure, exemplary amide compounds represented by Formula (II) include N-(meth)acryloyl heterocyclic compounds such as N-(meth)acryloylmorpholine, N-(meth)acryloylpiperidine, N-(meth)acryloylpyrrolidine, and N-(meth) acryloylpiperazine.

Another preferred example of the amide compounds represented by Formula (I) and having a polymerizable functional group is a compound of Formula (I) in which $R^2$ (or $R^3$) is vinyl group, and $R^1$ and $R^3$ (or $R^2$) are bound to each other to form a cyclic structure, namely, an amide compound (N-vinyl cyclic amide) represented by following Formula (III):

[Chem. 4]

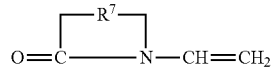

(III)

In Formula (III), $R^7$ is a divalent organic group, is not limited, but is exemplified by saturated or unsaturated hydrocarbon groups. Among them, saturated hydrocarbon groups (e.g., alkylene groups having 3 to 5 carbon atoms) are preferred.

Exemplary amide compounds (N-vinyl cyclic amides) represented by Formula (III) include N-vinyl-2-pyrrolidone, N-vinyl-2-piperidone, and N-vinyl-2-caprolactam.

Of the amide compounds represented by Formula (I) and having a polymerizable functional group, preferred are amide compounds represented by Formula (II) in which $R^5$ and $R^6$ are each independently hydrogen atom or a monovalent organic group; and N-vinyl cyclic amides represented by Formula (III), of which N-hydroxyethylacrylamide (HEAA) and N-vinyl-2-pyrrolidone (NVP) are more preferred. Each of the amide compounds may be used alone or in combination.

Of the amide compounds, those which will form a homopolymer with Tg of −10° C. or higher may be used as the "monomer forming a homopolymer with a Tg of −10° C. or higher." Namely, the amide compound(s) may be partially or fully the same as the monomer(s) forming a homopolymer with a Tg of −10° C. or higher. An amide compound of this type, when used, may help the pressure-sensitive adhesive sheet to have a higher moisture content and to have better bonding reliability at high temperatures, thus being desirable. Examples of the amide compound of this type include N-hydroxyethylacrylamide (HEAA) and N-vinyl-2-pyrrolidone (NVP).

Though not critical, the amide compound(s) represented by Formula (I) and having a polymerizable functional group is contained in a content of preferably from 5 to 20 percent by weight, more preferably from 5 to 17 percent by weight, and furthermore preferably from 5 to 15 percent by weight, based on the total monomer components (total amount of all the monomer components; 100 percent by weight) constituting the acrylic polymer. The use of the amide compound in a content of 5 percent by weight or more may contribute to better whitening resistance and high-temperature bonding reliability. In contrast, the use of the amide compound in a content of 20 percent by weight or less may contribute to better bump absorptivity.

The content of carboxyl-containing monomers in the monomer components constituting the acrylic polymer is preferably lowered. This is preferred for helping the pressure-sensitive adhesive sheet of the present invention to be further less corrosive to metals in the form of thin metal films and thin metal oxide films. Specifically, the content of carboxyl-containing monomers is preferably, for example, less than 5 percent by weight, more preferably 2 percent by weight or less (e.g., from 0 to 2 percent by weight), and furthermore preferably 0.5 percent by weight or less (e.g., from 0 to 0.5 percent by weight), based on the total amount (100 percent by weight) of the monomer components constituting the acrylic polymer. By controlling the content to less than 5 percent by weight, the pressure-sensitive adhesive sheet may be more satisfactorily less corrosive to thin metal films and thin metal oxide films. The carboxyl-containing monomers include, for example, (meth)acrylic acid, itaconic acid, maleic acid, fumaric acid, crotonic acid, and isocrotonic acid. In addition, the carboxyl-containing monomers also include acid anhydrides of these carboxyl-containing monomers, such as maleic anhydride, itaconic anhydride, and other acid-anhydride-containing monomers.

The acrylic polymer may be prepared by polymerizing the monomer components according to a known or customary polymerization technique. Exemplary polymerization techniques for the acrylic polymer include solution polymerization, emulsion polymerization, bulk polymerization, and polymerization upon irradiation with an active energy ray (active-energy-ray-polymerization). Among them, solution polymerization and active-energy-ray-polymerization are preferred in view of transparency, water resistance, and cost.

Exemplary active energy rays to be applied upon the active-energy-ray-polymerization (photopolymerization) include ionizing radiation such as alpha rays, beta rays, gamma rays, neutron beams, and electron beams; and ultraviolet rays, of which ultraviolet rays are preferred. The irradiation with the active energy ray is not limited in conditions such as irradiation energy, irradiation time, and irradiation procedure, as long as being capable of activating a photoinitiator to induce a reaction of monomer components.

The solution polymerization may employ any of common solvents. Exemplary solvents herein include esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; ketones such as methyl ethyl ketone and methyl isobutyl ketone, and other organic solvents. Each of the solvents may be used alone or in combination.

The preparation of the acrylic polymer may employ any of polymerization initiators such as photopolymerization initiators (photoinitiators) and thermal initiators, according to the type of the polymerization reaction. Each of different polymerization initiators may be used alone or in combination.

The photoinitiators are not limited, but usable ones are exemplified by benzoin ether photoinitiators, acetophenone photoinitiators, α-ketol photoinitiators, aromatic sulfonyl chloride photoinitiators, photoactive oxime photoinitiators, benzoin photoinitiators, benzil photoinitiators, benzophenone photoinitiators, ketal photoinitiators, and thioxanthone photoinitiators. Though not critical, the photoinitiator(s) is used in an amount of, for example, preferably from 0.01 to 0.2 part by weight and more preferably from 0.05 to 0.15 parts by weight, per 100 parts by weight of the total amount of monomer components constituting the acrylic polymer.

The benzoin ether photoinitiators include benzoin methyl ether, benzoin ethyl ether, benzoin propyl ether, benzoin isopropyl ether, benzoin isobutyl ether, 2,2-dimethoxy-1,2-diphenylethan-1-one, and anisole methyl ether. Exemplary acetophenone photoinitiators include 2,2-diethoxyacetophenone, 2,2-dimethoxy-2-phenylacetophenone, 1-hydroxycyclohexyl phenyl ketone, 4-phenoxydichloroacetophenone, and 4-(t-butyl)dichloroacetophenone. Exemplary α-ketol photoinitiators include 2-methyl-2-hydroxypropiophenone and 1-[4-(2-hydroxyethyl)phenyl]-2-methylpropan-1-one. Exemplary aromatic sulfonyl chloride photoinitiators include 2-naphthalenesulfonyl chloride. Examples of the photoactive oxime photoinitiators include 1-phenyl-1,1-propanedione-2-(o-ethoxycarbonyl)-oxime. Examples of the benzoin photoinitiators include benzoin. Examples of the benzil photoinitiators include benzil. Exemplary benzophenone photoinitiators include benzophenone, benzoylbenzoic acid, 3,3'-dimethyl-4-methoxybenzophenone, polyvinylbenzophenones, and α-hydroxycyclohexyl phenyl ketone. The ketal photoinitiators are typified by benzyl dimethyl ketal. Exemplary thioxanthone photoinitiators include thioxanthone, 2-chlorothioxanthone, 2-methylthioxanthone, 2,4-dimethylthioxanthone, isopropylthioxanthone, 2,4-diisopropylthioxanthone, and dodecylthioxanthone.

Exemplary polymerization initiators for use in the polymerization of the acrylic polymer through solution polymerization include azo initiators, peroxide polymerization initiators (e.g., dibenzoyl peroxide and tert-butyl permaleate), and redox polymerization initiators. Among them, azo initiators disclosed in JP-A No. 2002-69411 are particularly preferred. Such azo initiators are preferred, because they give decomposed products which hardly remain in the acrylic polymer as moieties causing gas evolution (outgassing) due to heating. The azo initiators are exemplified by 2,2'-azobisisobutyronitrile (hereinafter also referred to as AIBN), 2,2'-azobis-2-methylbutyronitrile (hereinafter also referred to as AMBN), dimethyl 2,2'-azobis(2-methylpropionate), and 4,4'-azobis-4-cyanovaleric acid. The azo initiator(s) is used in an amount of preferably from 0.05 to 0.5 part by weight and more preferably from 0.1 to 0.3 part by weight, per 100 parts by weight of the total amount of monomer components constituting the acrylic polymer.

The acrylic polymer has a weight-average molecular weight (Mw) of preferably from $40\times10^4$ to $200\times10^4$ and more preferably from $50\times10^4$ to $150\times10^4$. The acrylic polymer, when having a weight-average molecular weight of $40\times10^4$ or more, may contribute to better bonding reliability at high temperatures. In contrast, the acrylic polymer, when having a weight-average molecular weight of 200×10⁴ or less, may not cause an excessively high storage shear modulus (23° C.) of the pressure-sensitive adhesive layer, thus contributing to better bump absorptivity. The acrylic polymer in this case does not cause the pressure-sensitive adhesive composition to have an excessively high viscosity, thus contributing to better coatability.

The weight-average molecular weight of the acrylic polymer can be controlled typically by the type and amount of the polymerization initiator, and the polymerization conditions such as temperature, time, monomer concentration, and monomer dropping rate.

The acrylic polymer has a molecular weight distribution (Mw/Mn) of preferably 15 or less and more preferably 12 or less. The acrylic polymer, when having a molecular weight distribution of 15 or less, may contribute to better bonding reliability at high temperatures.

The molecular weight distribution (Mw/Mn) of the acrylic polymer can be controlled typically by the type and amount of the polymerization initiator, and the polymerization temperature.

The weight-average molecular weight (Mw) and the molecular weight distribution (Mw/Mn) of the acrylic polymer herein may be measured through gel permeation chromatography (GPC). More specifically, these may be measured by the method described in "(1) Weight-average Molecular Weight and Molecular Weight Distribution" in after-mentioned "Evaluations".

The acrylic polymer has a glass transition temperature (Tg) of preferably from −65° C. to −20° C. and more preferably from −60° C. to −30° C., for the control of the storage shear modulus (23° C.). The acrylic polymer, when having a glass transition temperature of −65° C. or higher, may contribute to better bonding reliability at high temperatures. In contrast, the acrylic polymer, when having a glass transition temperature of −20° C. or lower, does not cause an excessively high storage shear modulus (23° C.) of the acrylic pressure-sensitive adhesive layer, thus contributing to better bump absorptivity.

The glass transition temperature (Tg) of the acrylic polymer is a glass transition temperature (theoretical value) expressed by the following expression:

$$1/Tg = W_1/Tg_1 + W_2/Tg_2 + \ldots + W_n/Tg_n$$

wherein Tg represents the glass transition temperature (unit: K) of the acrylic polymer; $Tg_i$ represents the glass transition temperature (unit: K) of a homopolymer formed from a monomer "i"; and $W_i$ represents the weight fraction of the monomer "i" in all the monomer components, where i= 1, 2, . . . n. The expression is a computational expression assuming that the acrylic polymer is formed from monomer components of n types, including monomer 1, monomer 2, . . . , and monomer n.

The glass transition temperature of the acrylic polymer can be controlled typically by the types and contents of monomers constituting the acrylic polymer.

Where necessary, the pressure-sensitive adhesive composition (acrylic pressure-sensitive adhesive composition) for the formation of the acrylic pressure-sensitive adhesive layer in the present invention may employ any of known additives within ranges not adversely affecting the properties obtained by the present invention. Such additives include crosslinking agents, crosslinking promoters, silane coupling agents, tackifier resins (e.g., rosin derivatives, polyterpene resins, petroleum resins, and oil-soluble phenols), age inhibitors, fillers, colorants (e.g., pigments and dyestuffs), ultraviolet absorbers, antioxidants, chain-transfer agents, plasticizers, softeners, surfactants, and antistatic agents. The formation of the acrylic pressure-sensitive adhesive layer in the present invention may also employ any of common solvents. The solvent for use herein is not limited in its type and may be any of those listed as the solvents for use in the solution polymerization.

The crosslinking agent, when used, crosslinks the acrylic polymer as a principal component of the acrylic pressure-sensitive adhesive layer in the present invention and thereby contributes to the control of the gel fraction of the pressure-sensitive adhesive layer. Exemplary crosslinking agents include isocyanate crosslinking agents, epoxy crosslinking agents, melamine crosslinking agents, and peroxide crosslinking agents, as well as urea crosslinking agents, metal alkoxide crosslinking agents, metal chelate crosslinking agents, metal salt crosslinking agents, carbodiimide crosslinking agents, oxazoline crosslinking agents, aziridine crosslinking agents, and amine crosslinking agents. Each of the crosslinking agents may be used alone or in combination. Among them, isocyanate crosslinking agents and epoxy crosslinking agents are preferred, of which isocyanate crosslinking agents are more preferred, for better bonding reliability at high temperatures.

The isocyanate crosslinking agents (multifunctional isocyanate compounds) include lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, and hydrogenated xylene diisocyanate; and aromatic polyisocyanates such as 2,4-tolylene diisocyanate, 2,6-tolylene diisocyanate, 4,4'-diphenylmethane diisocyanate, and xylylene diisocyanate. Among them, cyclohexane diisocyanate (cyclohexylene diisocyanate) is preferred. The isocyanate crosslinking agents are also available as commercial products such as an adduct of tolylene diisocyanate with trimethylolpropane [trade name "CORONATE L" from Nippon Polyurethane Industry Co., Ltd.], an adduct of hexamethylene diisocyanate with trimethylolpropane [trade name "CORONATE HL" from Nippon Polyurethane Industry Co., Ltd.], and an adduct of xylylene diisocyanate with trimethylolpropane [trade name "TAKENATE 110N" from Mitsui Chemicals Inc.].

The epoxy crosslinking agents (multifunctional epoxy compounds) are typified by N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, diglycidyl adipate, o-diglycidyl phthalate, triglycidyl-tris(2-hydroxyethyl) isocyanurate, resorcinol diglycidyl ether, and bisphenol-S diglycidyl ether, as well as epoxy resins each having two or more epoxy groups per molecule. The epoxy crosslinking agents are also available as commercial products such as trade name "TETRAD C" from Mitsubishi Gas Chemical Company, Inc.

Though not critical, the crosslinking agent(s) is contained in the pressure-sensitive adhesive composition in a content of, for example, preferably from 0.001 to 10 parts by weight and more preferably from 0.01 to 5 parts by weight, per 100 parts by weight of the total amount of monomer components constituting the acrylic polymer. Particularly for better bonding reliability at high temperatures and better bump absorptivity, the isocyanate crosslinking agent(s) is contained preferably in a content of from 0.1 to 10 parts by weight and more preferably from 0.1 to 5 parts by weight, per 100 parts by weight of the total amount of monomer components constituting the acrylic polymer.

Specifically, the acrylic pressure-sensitive adhesive layer in the present invention is preferably an acrylic pressure-sensitive adhesive layer formed from a pressure-sensitive adhesive composition which includes the acrylic polymer and the isocyanate crosslinking agent and contains the isocyanate crosslinking agent in a content of from 0.1 to 10 parts by weight per 100 parts by weight of the total amount of monomer components constituting the acrylic polymer.

The pressure-sensitive adhesive composition may employ an amine compound containing two or more hydroxyl groups as a crosslinking promoter (coagent) for accelerating a crosslinking reaction. The amine compound containing two or more hydroxyl groups is not limited, as long as being an amine compound having at least two hydroxyl groups (alcoholic hydroxyl groups) per molecule. Of such amine compounds, for example, amine compounds containing two or more hydroxyl groups disclosed in JP-A No. 2009-079203 are preferably usable. The amine compound having two or more hydroxyl groups, when used, may increase the crosslinking rate (accelerate the crosslinking), thus contributing to better productivity. The amine compound may also be any of commercially available products such as those under the trade names of "EDP-300," "EDP-450," "EDP-1100," and "Pluronic" (each from ADEKA CORPORATION).

The amine compound containing two or more hydroxyl groups may be contained in the pressure-sensitive adhesive composition in a content of, for example, preferably from 0.01 to 5.0 parts by weight and more preferably from 0.05 to 1.0 part by weight, per 100 parts by weight of the total amount of monomer components constituting the acrylic polymer. This is preferred for increasing the crosslinking rate, thereby shortening the aging time, and improving the productivity.

The pressure-sensitive adhesive composition may further contain a silane coupling agent for better adhesiveness to glass, and particularly for better bonding reliability to glass in hot and humid conditions. The silane coupling agent is not limited, but preferred examples thereof include γ-glycidoxypropyltrimethoxysilane, γ-glycidoxypropyltriethoxysilane, γ-aminopropyltrimethoxysilane, and N-phenyl-aminopropyltrimethoxysilane. Among them, γ-glycidoxypropyltrimethoxysilane is preferred. Each of the silane coupling agents may be used alone or in combination. The silane coupling agent may also be available as commercial products such as one under the trade name of "KBM-403" (from Shin-Etsu Chemical Co., Ltd.).

For better bonding reliability to glass, the silane coupling agent(s) is contained in the pressure-sensitive adhesive composition in a content of, for example, preferably from 0.01 to 1 part by weight and more preferably from 0.03 to 0.5 part by weight, per 100 parts by weight of the total amount of monomer components constituting the acrylic polymer.

Though not critical, the acrylic pressure-sensitive adhesive layer in the present invention has a thickness of preferably from 10 to 500 μm, more preferably from 10 to 250 μm, and particularly preferably from 10 to 200 μm. The acrylic pressure-sensitive adhesive layer, when having a thickness of 10 μm or more, may readily disperse stress occurring upon the affixation, may thereby become resistant to separation, and may have better bump absorptivity. In contrast, the acrylic pressure-sensitive adhesive layer, when having a thickness of 500 μm or less, may become resistant to wrinkling upon winding after application.

The acrylic pressure-sensitive adhesive layer in the present invention has a storage shear modulus at 23° C. (hereinafter also referred to as "storage shear modulus (23° C.)" or "G' (23° C.)") of from $0.8 \times 10^5$ to $5.0 \times 10^5$ Pa, preferably from $0.8 \times 10^5$ to $4.0 \times 10^5$ Pa, and more preferably from $0.8 \times 10^5$ to $3.0 \times 10^5$ Pa, as measured by dynamic viscoelastometry. The acrylic pressure-sensitive adhesive layer, as having a storage shear modulus (23° C.) of $0.8 \times 10^5$ Pa or more, does not become excessively flexible (soft) and less suffers from problems such as "edge-oozing of the adhesive." The edge-oozing of the adhesive is a phenomenon in which the pressure-sensitive adhesive layer deforms upon lamination and oozes out from the edge of a laminated member. In contrast, the acrylic pressure-sensitive adhesive layer, as having a storage shear modulus (23° C.) of $5.0 \times 10^5$ Pa or less, has better bump absorptivity and thereby less suffers from the formation of bubbles and gaps upon lamination. The storage shear modulus (23° C.) is measured by dynamic viscoelastometry. For example, the storage shear modulus (23° C.) may be measured by laminating multiple plies of the acrylic pressure-sensitive adhesive layer in the present invention to a thickness of about 1.5 mm to give a specimen, and measuring a storage shear modulus of the specimen under conditions of a frequency of 1 Hz at temperatures of from −70° C. to 200° C. at a rate of temperature rise of 5° C. per minute with "Advanced Reometric Expansion System (ARES)" supplied by Reometric Scientific (now TA Instruments) in a shear mode.

The storage shear modulus (23° C.) may be controlled typically by the glass transition temperature and molecular weights (weight-average molecular weight and molecular weight distribution) of the acrylic polymer.

The acrylic pressure-sensitive adhesive layer in the present invention has a gel fraction of preferably from 40% to 95% (percent by weight) and more preferably from 50% to 90%, for better blistering/separation resistance (such a property as not to suffer from blistering and separation at high temperatures). The gel fraction can be determined as an insoluble fraction in ethyl acetate. Specifically, the gel fraction can be determined by immersing a sample acrylic pressure-sensitive adhesive layer in ethyl acetate at 23° C. for 7 days, measuring the weight of insoluble matter, and determining the weight fraction (unit: percent by weight) of insoluble matter with respect to the weight of the sample before immersion. The acrylic pressure-sensitive adhesive layer, when having a gel fraction of 40% or more, may have better bonding reliability at high temperatures. In contrast, the acrylic pressure-sensitive adhesive layer, when having a gel fraction of 95% or less, may have better bump absorptivity.

Specifically, the gel fraction (percentage of solvent-insoluble matter) is a value determined typically by the following "Method for Gel Fraction Measurement."

(Method for Gel Fraction Measurement)

About 0.1 g of the acrylic pressure-sensitive adhesive layer in the present invention is sampled from the pressure-sensitive adhesive sheet of the present invention to give a specimen, the specimen is covered by a porous tetrafluoroethylene sheet (trade name "NTF1122" supplied by Nitto Denko Corporation) having an average pore size of 0.2 rim, tied with a kite string, and the weight of the resulting article is measured and defined as a "weight before immersion." The weight before immersion is the total weight of the acrylic pressure-sensitive adhesive layer (the sampled acrylic pressure-sensitive adhesive layer in the present invention), the tetrafluoroethylene sheet, and the kite string. Independently, the total weight of the tetrafluoroethylene sheet and the kite string is measured and defined as a "tare weight."

Next, the specimen acrylic pressure-sensitive adhesive layer in the present invention covered by the tetrafluoroethylene sheet and tied with the kite string (this article is hereinafter referred to as "sample") is placed in a 50-ml vessel filled with ethyl acetate and left stand at 23° C. for 7 days. The sample (after treatment with ethyl acetate) is recovered from the vessel, transferred into an aluminum cup, dried in an oven at 130° C. for 2 hours to remove ethyl'acetate, and the weight of the dried sample is measured and defined as a "weight after immersion."

The gel fraction is then calculated according to the following expression:

Gel Fraction (percent by weight)=$((A-B)/(C-B))\times 100$ wherein A is the weight after immersion; B is the tare weight; and C is the weight before immersion.

The gel fraction can be controlled typically by the monomer composition and weight-average molecular weight of the acrylic polymer, and the amount (added amount) of the crosslinking agent.

A soluble fraction (sol fraction) obtained upon extraction of the acrylic pressure-sensitive adhesive layer in the present invention with ethyl acetate (this fraction is hereinafter also simply referred to as a "sol fraction") has a weight-average molecular weight of preferably from $5\times 10^4$ to $70\times 10^4$ and more preferably from $10\times 10^4$ to $70\times 10^4$. The acrylic pressure-sensitive adhesive layer, when having a weight-average molecular weight of the sol fraction of $5\times 10^4$ or more, may contain less amounts of low molecular weight components, thereby have better blistering/separation resistance, and have better bonding reliability at high temperatures. In contrast, the acrylic pressure-sensitive adhesive layer, when having a weight-average molecular weight of the sol fraction of $70\times 10^4$ or less, may be formed with better coatability.

The "weight-average molecular weight of the soluble fraction (sol fraction) extracted with ethyl acetate" is determined according to the following measurement method.

(Method for Measurement of Weight-average Molecular Weight of Soluble Fraction (Sol Fraction) Extracted with Ethyl Acetate)

About 0.1 g of the acrylic pressure-sensitive adhesive layer in the present invention is sampled from the pressure-sensitive adhesive sheet of the present invention, covered by a porous tetrafluoroethylene sheet (trade name "NTF1122" supplied by Nitto Denko Corporation) having an average pore size of 0.2 μm, and tied with a kite string.

Next, the acrylic pressure-sensitive adhesive layer covered by the tetrafluoroethylene sheet and tied with the kite string is placed in a 50-ml vessel filled with ethyl acetate, and left stand at 23° C. for 7 days. An ethyl acetate solution (including extracted sol) is recovered from the vessel, dried under reduced pressure to volatilize the solvent (ethyl acetate), and thereby yields a sol fraction.

The sol fraction is dissolved in tetrahydrofuran (THF), and the weight-average molecular weight of the sol fraction is measured by gel permeation chromatography (GPC).

The weight-average molecular weight of the sol fraction can be controlled typically by the weight-average molecular weight of the acrylic polymer, and the type and amount (added amount) of the crosslinking agent.

The acrylic pressure-sensitive adhesive layer in the present invention has a haze of, for example, preferably 3.0% or less and more preferably 1.5% or less, as measured in accordance with Japanese Industrial Standards (JIS) K7136. The acrylic pressure-sensitive adhesive layer, when having a haze of 3.0% or less, has better transparency and less adversely affects the transparency and appearances of optical products and optical parts using the pressure-sensitive adhesive sheet. The haze may be measured typically by applying the acrylic pressure-sensitive adhesive layer in the present invention to a glass slide (e.g., one having a total light transmittance of 91.8% and a haze of 0.4%) and measuring a haze with a hazemeter (trade name "HM-150" supplied by Murakami Color Research Laboratory).

The acrylic pressure-sensitive adhesive layer in the present invention has a total light transmittance in the visible light wavelength region of typically preferably 90% or more and more preferably 91% or more, as measured in accordance with JIS K7361-1. The acrylic pressure-sensitive adhesive layer, when having a total light transmittance of 90% or more, has higher transparency and less adversely affects the transparency and appearances of optical products and optical parts. The total light transmittance can be measured typically by applying the acrylic pressure-sensitive adhesive layer in the present invention to a glass slide (e.g., one having a total light transmittance of 91.8% and a haze of 0.4%) and measuring a total light transmittance with a hazemeter (trade name "HM-150" supplied by Murakami Color Research Laboratory).

Formation of the acrylic pressure-sensitive adhesive layer in the present invention can employ any of known or customary methods for forming pressure-sensitive adhesive layers, may differ depending on the polymerization technique of the acrylic polymer, and is not limited. Such formation methods are exemplified by the following methods (1) to (3): method (1) of applying a composition to a substrate or separator and irradiating the applied composition with an active energy ray (of which an ultraviolet ray is preferred) to form a pressure-sensitive adhesive layer, in which the composition contains a mixture (monomer mixture) of monomer components constituting an acrylic polymer, or a partial polymer of the monomer mixture, and, where necessary, additives such as a photoinitiator and/or a crosslinking agent; method (2) of applying a composition (solution) to a substrate or separator, and drying and/or curing the applied composition to form a pressure-sensitive adhesive layer, in which the composition (solution) contains an acrylic polymer, a solvent, and, where necessary, additives such as a crosslinking agent; and method (3) of further drying the pressure-sensitive adhesive layer formed in the method (1).

The application (coating) in the method for forming the acrylic pressure-sensitive adhesive layer in the present invention can employ any of coating processes and may employ any of customary coaters such as rotogravure roll coater, reverse roll coater, kiss-contact roll coater, dip roll coater, bar coater, knife coater, spray coater, comma coater, and direct coater.

[Substrate]

When the pressure-sensitive adhesive sheet of the present invention has a substrate, the substrate is not limited, but is exemplified by various optical films such as plastic films, anti-reflection (AR) films, polarizing plates, and retardation films. Exemplary materials of the plastic films and other films include plastic materials including polyester resins (e.g., poly(ethylene terephthalate)s (PETS)), acrylic resins (e.g., poly(methyl methacrylate)s (PMMAs)), polycarbonates, triacetylcellulose (TAC), polysulfones, polyarylates, polyimides, poly(vinyl chloride)s, poly(vinyl acetate)s, polyethylenes, polypropylenes, ethylene-propylene copolymers, and cyclic olefinic polymers (e.g., trade name "ARTON (cyclic olefinic polymer; supplied by JSR)" and trade name "ZEONOR (cyclic olefinic polymer; supplied by ZEON CORPORATION)"). Each of such plastic materials may be used alone or in combination. As used herein the term "substrate" refers to a portion which will be affixed, together with the pressure-sensitive adhesive layer, to an adherend (e.g., an optical member). The "substrate" does not include a separator (release liner) which will be removed upon use (affixation) of the pressure-sensitive adhesive sheet.

Among them, a transparent substrate is preferred as the substrate. As used herein the term "transparent substrate" refers to a substrate having a total light transmittance in the visible light wavelength region of preferably 85% or more, and furthermore preferably 88% or more, as measured in accordance with JIS K7361-1. The substrate has a haze of, for example, preferably 1.5% or less and more preferably 1.0% or less, as measured in accordance with JIS $K_{7136}$. Examples of the transparent substrate include PET films and non-oriented films such as products under the trade name "ARTON" and trade name "ZEONOR."

Though not critical, the substrate has a thickness of typically preferably from 12 to 75 μm. The substrate may have either a single-layer structure or a multilayer structure. The surface of the substrate may have undergone any of known or customary surface treatments including physical treatments such as corona discharge treatment and plasma treatment; and chemical treatments such as primer coating.

When the pressure-sensitive adhesive sheet of the present invention has a substrate, the substrate may be any of various functional films. In this case, the pressure-sensitive adhesive sheet of the present invention serves as a pressure-sensitive adhesive functional film including a functional film and, on at least one side thereof, an acrylic pressure-sensitive adhesive layer in the present invention. Examples of the functional film include, but are not limited to, films each having any of optical functionalities (e.g., polarizability, photorefractivity, light reflectivity, optical transparency, optical absorptivity, optical diffractive ability, optical rotatory power, and visibility), films having electroconductivity (e.g., indium-tin-oxide (ITO) films), films having ultraviolet protection ability (ultraviolet screening ability), and films having a hard-coating function (scratch resistance). More specific examples of them include hard coat films (films each including a plastic film, such as a PET film, at least one side of which has been subjected to a hard coating treatment), polarizing films, wave plates, retardation films, compensation films, brightness enhancing films, light guide panels, reflective films, anti-reflection films, transparent conductive films (e.g., ITO films), films with graphical design functions, decorative films, surface-protecting films, prisms, and color filters. As used herein the terms "plate (panel)" and "film" each include ones in the form of plates (or panels), films, and sheets. Typically, the "polarizing films" also include "polarizing plates" and "polarizing sheets." Also as used herein the term "functional film" also includes a "functional plate" and a "functional sheet."

[Other Pressure-sensitive Adhesive Layer]

When the pressure-sensitive adhesive sheet of the present invention has another pressure-sensitive adhesive layer, the other pressure-sensitive adhesive layer is not limited, but is exemplified by known or customary pressure-sensitive adhesive layers formed from known pressure-sensitive adhesives such as urethane pressure-sensitive adhesives, acrylic pressure-sensitive adhesives, rubber pressure-sensitive adhesives, silicone pressure-sensitive adhesives, polyester pressure-sensitive adhesives, polyamide pressure-sensitive adhesives, epoxy pressure-sensitive adhesives, vinyl alkyl ether pressure-sensitive adhesives, and fluorine-containing pressure-sensitive adhesives. Each of the pressure-sensitive adhesives may be used alone or in combination.

[Optical Pressure-sensitive Adhesive Sheet]

When stored in an environment of 60° C. and 95 percent relative humidity for 120 hour, the pressure-sensitive adhesive sheet of the present invention has a moisture content after (immediately after) the storage of 0.65 percent by weight or more (e.g., from 0.65 to 5.0 percent by weight), preferably from 0.65 to 3.0 percent by weight, and more preferably from 0.75 to 3.0 percent by weight. The pressure-sensitive adhesive sheet, as having the moisture content of 0.65 percent by weight or more, exhibits better whitening resistance and less adversely affects the visibility and appearances of optical products and optical members using the sheet.

Whitening of a pressure-sensitive adhesive sheet at high humidity is a phenomenon which occurs probably because a pressure-sensitive adhesive layer absorbs moisture when the pressure-sensitive adhesive sheet is placed in a hot and humid environment, and the absorbed moisture condenses. According to the present invention, the moisture content (moisture content after storage in an environment of 60° C. and 95 percent relative humidity for 120 hours) of the pressure-sensitive adhesive sheet is controlled to be 0.65 percent by weight or more. Thus, the pressure-sensitive adhesive sheet less suffers from whitening due to high humidity (namely, exhibits better whitening resistance). This is probably because such high water absorption of the pressure-sensitive adhesive sheet may impede the condensation of absorbed moisture even when the environment surrounding the pressure-sensitive adhesive sheet significantly changes (typically when the environment changes from a hot and humid environment to a room-temperature environment).

The moisture content is preferably a value determined by storing the pressure-sensitive adhesive sheet of the present invention in an environment of 60° C. and 95 percent relative humidity for 120 hours, recovering the sheet to a room-temperature environment (23° C. and 50 percent relative humidity), and measuring a moisture content of the sheet immediately after the recovery (e.g., from 0 to about 10 minutes after the recovery). Specifically, the moisture content of the pressure-sensitive adhesive sheet of the present invention can be measured typically by storing the pressure-sensitive adhesive sheet of the present invention in an environment of 60° C. and 95 percent relative humidity for 120 hours, recovering the sheet into an environment of 23° C. and 50 percent relative humidity, and measuring a moisture content of the sheet according to following [Method for Moisture Content Measurement]. When the pressure-sensitive adhesive sheet of the present invention has a separator, the separator is removed before the storage in an environment of 60° C. and 95 percent relative humidity.

[Method for Moisture Content Measurement]

(Preparation of Specimen and Measurement of Moisture Content)

When the pressure-sensitive adhesive sheet of the present invention is a double-coated pressure-sensitive adhesive sheet, a specimen is prepared by cutting the pressure-sensitive adhesive sheet to a piece of a size of 1 cm wide by 2 cm long (area: 2 cm$^2$), applying one adhesive face (surface of the pressure-sensitive adhesive layer) to an aluminum foil, and leaving (or making) the other adhesive face being exposed. When the pressure-sensitive adhesive sheet of the present invention is a single-coated pressure-sensitive adhesive sheet, a specimen is prepared by cutting the pressure-sensitive adhesive sheet to a piece of a size of 1 cm wide by 2 cm long (area: 2 cm$^2$) and leaving (or making) the adhesive face being exposed.

The specimen (specimen after storage in an environment of 60° C. and 95 percent relative humidity for 120 hours) is weighed, placed in a thermal vaporizer, heated at 150° C., and a gas evolved during heating is collected and introduced into a titration cell. Next, the amount of moisture (μg) in the specimen is measured with an after-mentioned moisture meter of coulometric titration system (coulometric moisture meter) under after-mentioned measurement conditions, from which an amount of moisture per 1 g of the pressure-sensitive adhesive sheet of the present invention (in the case of a double-coated pressure-sensitive adhesive sheet, per 1 g of the weight determined by subtracting the weight of the aluminum foil from the weight of the specimen) is determined, and thereby the moisture content (percent by weight) of the pressure-sensitive adhesive sheet is calculated. The number (n) of measurements is typically preferably two.

(Analyzer)
  Coulometric moisture meter: Model CA-06, Mitsubishi Chemical Corporation
  Thermal vaporizer: Model VA-06, Mitsubishi Chemical Corporation (Measurement Conditions)
  Method: Vaporization by heating; heating at 150° C.
  Anolyte: AQUAMICRON AKX
  Catholyte: AQUAMICRON CXU The pressure-sensitive adhesive sheet of the present invention has a haze of, for example, preferably 3.0% or less and more preferably 1.5% or less, as measured in accordance with JIS K7136. The pressure-sensitive adhesive sheet, when having a haze of 3.0% or less, may less adversely affect the appearance and transparency of optical products and optical members. The haze can be measured typically by the procedure as in the haze of the acrylic pressure-sensitive adhesive layer.

Though not critical, the pressure-sensitive adhesive sheet of the present invention has a total light transmittance in the visible light wavelength region of preferably 87% or more and more preferably 89% or more, as measured in accordance with JIS K7361-1. The pressure-sensitive adhesive sheet, when having a total light transmittance of 87% or more, may less adversely affect the appearance and transparency of optical products and optical members. The total light transmittance can be measured, for example, by the procedure as in the total light transmittance of the acrylic pressure-sensitive adhesive layer The pressure-sensitive adhesive sheet of the present invention has a haze of, for example, preferably 3.5% or less and more preferably 2.5% or less after (immediately after) storage in an environment of 60° C. and 95 percent relative humidity for 120 hours. The haze after (immediately after) storage in an environment of 60° C. and 95 percent relative humidity for 120 hours is hereinafter also referred to as a "haze (after exposure to moist and heat, immediate)." The pressure-sensitive adhesive sheet, when having a haze (after exposure to moist and heat, immediate) of 3.5% or less, may have more satisfactory whitening resistance and may less adversely affect the appearance and transparency of optical products and optical members. The haze (after exposure to moist and heat, immediate) can be measured typically by applying the pressure-sensitive adhesive sheet of the present invention to a glass slide (e.g., one having a total light transmittance of 91.8% and a haze of 0.4%), storing this in an environment of 60° C. and 95 percent relative humidity for 120 hours, recovering the article into an environment of 23° C. and 50 percent relative humidity, and measuring a haze immediately after the recovery using a hazemeter (trade name "HM-150" supplied by Murakami Color Research Laboratory).

When stored in an environment of 60° C. and 95 percent relative humidity for 250 hours and recovered to an environment of 23° C. and 50 percent relative humidity, the pressure-sensitive adhesive sheet of the present invention preferably has differences of each less than 5% between each of a haze immediately after the recovery, a haze 30 minutes after the recovery, a haze one hour after the recovery, a haze 3 hours after the recovery, and a haze 6 hours after the recovery, respectively, and a haze before the storage in an environment of 60° C. and 95 percent relative humidity for 250 hours. Specifically, the pressure-sensitive adhesive sheet of the present invention has differences of preferably each less than 5% (percentage points) and more preferably each less than 3%, in which the differences are a difference between the haze immediately after the recovery to an environment of 23° C. and 50 percent relative humidity subsequent to the storage in an environment of 60° C. and 95 percent relative humidity for 250 hours and the haze before the storage in an environment of 60° C. and 95 percent relative humidity for 250 hours [(Haze immediately after the recovery to an environment of 23° C. and 50 percent relative humidity subsequent to the storage in an environment of 60° C. and 95 percent relative humidity for 250 hours)–(Haze before the storage in an environment of 60° C. and 95 percent relative humidity for 250 hours)]; a difference between the haze 30 minutes after the recovery to an environment of 23° C. and 50 percent relative humidity subsequent to the storage in an environment of 60° C. and 95 percent relative humidity for 250 hours and the haze before the storage in an environment of 60° C. and 95 percent relative humidity for 250 hours [(Haze 30 minutes after the recovery to an environment of 23° C. and 50 percent relative humidity subsequent to the storage in an environment of 60° C. and 95 percent relative humidity for 250 hours)–(Haze before the storage in an environment of 60° C. and 95 percent relative humidity for 250 hours)]; a difference between the haze one hour after the recovery to an environment of 23° C. and 50 percent relative humidity subsequent to the storage in an environment of 60° C. and 95 percent relative humidity for 250 hours and the haze before the storage in an environment of 60° C. and 95 percent relative humidity for 250 hours [(Haze one hour after the recovery to an environment of 23° C. and 50 percent relative humidity subsequent to the storage in an environment of 60° C. and 95 percent relative humidity for 250 hours)–(Haze before the storage in an environment of 60° C. and 95 percent relative humidity for 250 hours)]; a difference between the haze 3 hours after the recovery to an environment of 23° C. and 50 percent relative humidity subsequent to the storage in an environment of 60° C. and 95 percent relative humidity for 250 hours and the haze before the storage in an environment of 60° C. and 95 percent relative humidity for 250 hours [(Haze 3 hours after the recovery to an environment of 23° C. and 50 percent relative humidity subsequent to the storage in an environment of 60° C. and 95 percent relative humidity for 250 hours)–(Haze before the storage in an environment of 60° C. and 95 percent relative humidity for 250 hours)]; and a difference between the haze 6 hours after the recovery to an environment of 23° C. and 50 percent relative humidity subsequent to the storage in an environment of 60° C. and 95 percent relative humidity for 250 hours and the haze before the storage in an environment of 60° C. and 95 percent relative humidity for 250 hours [(Haze 6 hours after the recovery to an environment of 23° C. and 50 percent relative humidity subsequent to the storage in an environment of 60° C. and 95 percent relative humidity for 250 hours)–(Haze before the storage in an environment of 60° C. and 95 percent relative humidity for 250 hours)]. The pressure-sensitive adhesive sheet, when having the differences in haze of each less than 5%, may exhibit better whitening resistance and may less adversely affect the appearance and transparency of optical products and optical members. As used herein the "haze before the storage in an environment of 60° C. and 95 percent relative humidity for 250 hours" refers to a haze of the pressure-sensitive adhesive sheet measured after humidity conditioning by placing the pressure-sensitive adhesive sheet in an environment of 23° C. and 50 percent relative humidity for at least 24 hours.

The differences in haze of the pressure-sensitive adhesive sheet of the present invention can be measured typically by the following method.

Initially, a test piece is prepared by leaving the pressure-sensitive adhesive sheet of the present invention in an environment of 23° C. and 50 percent relative humidity for at least 24 hours for humidity conditioning, and applying the sheet to a glass slide (e.g., one having a total light transmittance of 91.8% and a haze of 0.4%). When the pressure-sensitive adhesive sheet of the present invention is a double-coated pressure-sensitive adhesive sheet, the test piece is prepared by further laminating a PET film having a thickness of 100 μm (e.g., one having a haze of 0.6%) to an adhesive face opposite to the glass slide. The haze (haze before the storage in an environment of 60° C. and 95 percent relative humidity for 250 hours) of the test piece is then measured.

Next, the test piece is stored in an environment of 60° C. and 95 percent relative humidity for 250 hours, and then recovered to an environment of 23° C. and 50 percent relative humidity. On the test piece, a haze immediately after the recovery to an environment of 23° C. and 50 percent relative humidity, a haze 30 minutes after the recovery, a haze one hour after the recovery, a haze 3 hours after the recovery, and a haze 6 hours after the recovery are measured.

Differences between the haze before the storage in an environment of 60° C. and 95 percent relative humidity for 250 hours and each of the haze immediately after the recovery to an environment of 23° C. and 50 percent relative humidity subsequent to the storage in an environment of 60° C. and 95 percent relative humidity for 250 hours, the haze 30 minutes after the recovery, the haze one hour after the recovery, the haze 3 hours after the recovery, and the haze 6 hours after the recovery, respectively, are calculated.

More specifically, the differences may be measured by a method described in "(8) Difference in Haze" in after-mentioned "Evaluations".

The total amount, as measured through ion chromatography, of acrylic acid ions and methacrylic acid ions extracted from the pressure-sensitive adhesive sheet of the present invention with pure water under conditions of 100° C. for 45 minutes is hereinafter also referred to as an "amount of extracted (meth)acrylic acid ions." The amount of extracted (meth)acrylic acid ions is preferably 20 ng/cm² or less (e.g., from 0 to 20 ng/cm²), more preferably from 0 to 17 ng/cm², and furthermore preferably from 0 to 15 ng/cm², per unit area of the acrylic pressure-sensitive adhesive layer in the present invention. The amount of extracted (meth)acrylic acid ions indicates how readily acrylic acid ions and methacrylic acid ions liberate from the pressure-sensitive adhesive layer by the action of water when the pressure-sensitive adhesive sheet of the present invention is placed in a humid environment (high-humidity environment). The pressure-sensitive adhesive sheet, when having an amount of extracted (meth)acrylic acid ions of 20 ng/cm² or less, may less cause corrosion typically to a thin metal film and exhibit better less-corrosive properties, even when the sheet is applied to the thin metal film and is stored in the presence of moisture (water) such as in a humid environment.

The "total amount, as measured through ion chromatography, of acrylic acid ions and methacrylic acid ions extracted from the pressure-sensitive adhesive sheet of the present invention with pure water under conditions of 100° C. for 45 minutes" may be measured according to the following method.

Initially, a test piece is prepared by cutting a sample pressure-sensitive adhesive sheet to a suitable size, and removing a separator, if provided, to expose an adhesive face. When the sheet is a double-coated pressure-sensitive adhesive sheet, a PET film (25 to 50 μm thick) is applied to one adhesive face, and the other adhesive face is left exposed. In this process, an adhesive face to be applied to a thin metal film (surface of the acrylic pressure-sensitive adhesive layer in the present invention side in the case of the pressure-sensitive adhesive sheet of the present invention) is exposed. The test piece preferably has a size (exposed area of the adhesive face) of 100 cm².

Next, the test piece is placed in pure water at a temperature of 100° C., followed by boiling for 45 minutes for boiling extraction of acrylic acid ions and methacrylic acid ions to give an extract.

Next, the total amount (unit: ng) of acrylic acid ions and methacrylic acid ions in the above-obtained extract is measured through ion chromatography, from which the total amount of acrylic acid ions and methacrylic acid ions per unit area of the adhesive face (exposed adhesive face) of the test piece (unit: ng/cm²) is calculated. Though not limited, the ion chromatography may be performed under the following measurement conditions.

[Measurement Conditions for Ion Chromatography]
Analyzer: DX-320 from Dionex Corporation (now subsidiary of Thermo Fisher Scientific Inc.)
Separation column: Ion Pac AS15 (4 mm by 250 mm)
Guard column: Ion Pac AG15 (4 mm by 50 mm)
Suppressor: ASRS-ULTRA (external mode, 100 mA)
Detector: Electroconductivity detector
Eluent: 7 mM KOH (0 to 20 min.)
  45 mM KOH (20 to 30 min.)
  (using Eluent Generator EG40)
Eluent flow rate: 1.0 ml per minute
Sample volume: 250 μl (Meth)acrylic acid ions liberated from the pressure-sensitive adhesive sheet by the action of water are generally derived from (meth)acrylic acid present in the acrylic pressure-sensitive adhesive layer. The (meth)acrylic acid ions cause increase in resistance of a thin metal film (corrosion of the thin metal film). This is probably because the (meth) acrylic acid ions migrate into the thin metal film by the action of water under hot and humid conditions and impede the conduction. When a large amount (e.g., 10 percent by weight or more) of (meth)acrylic acid (particularly, acrylic acid) is used as a monomer component constituting an acrylic polymer so as to increase the adhesiveness of a pressure-sensitive adhesive sheet, unreacted (meth)acrylic acid generally often remains in the resulting acrylic pressure-sensitive adhesive layer, and this may tend to increase the amount of (meth) acrylic acid ions liberated from the pressure-sensitive adhesive sheet by the action of water. In contrast, in a preferred embodiment of the present invention, the pressure-sensitive adhesive sheet liberates a less amount of (meth)acrylic acid ions by the action of water and thereby less causes the corrosion and resistance change of a thin metal film as an adherend, which corrosion and resistance change are caused by such liberated (meth)acrylic acid ions. This is because, according to the preferred embodiment, the amount of residual (meth) acrylic acid in the acrylic pressure-sensitive adhesive layer is reduced by performing sufficient drying in the formation of the pressure-sensitive adhesive layer, by performing the polymerization of the acrylic polymer for a long time, or by reducing the amount of (meth)acrylic acid to be used as a monomer component.

A surface (adhesive face) of the pressure-sensitive adhesive layer in the pressure-sensitive adhesive sheet of the present invention may be protected by a separator (release liner) before use. When the pressure-sensitive adhesive sheet of the present invention is a double-coated pressure-sensitive adhesive sheet, two adhesive faces may be protected by two separators, respectively, or may be protected by one separator having two release surfaces on both sides thereof, where the sheet with the separator is wound as a roll. The separator is used as a protector for the pressure-sensitive adhesive layer and will be removed when the pressure-sensitive adhesive layer is applied to an adherend. When the pressure-sensitive adhesive sheet of the present invention is a substrate-less pressure-sensitive adhesive sheet, the separator serves also as a support for the pressure-sensitive adhesive layer. The separator is not indispensable. The separator may for example be a customary release paper, is not limited, but is typified by bases having a layer undergone a surface release treatment; low-adhesive bases formed from fluorocarbon polymers; and low-adhesive bases formed from nonpolar polymers. Examples of the bases having a layer undergone a surface release treatment include plastic films and papers whose surface has been treated with any of release agents such as silicones, long-chain alkyls, fluorine-containing compounds, and molybdenum sulfide. Exemplary fluorocarbon polymers forming the low-adhesive bases include polytetrafluoroethylenes, polychlorotrifluoroethylenes, poly(vinyl fluoride)s, poly(vinylidene fluoride)s, tetrafluoroethylene-hexafluoropropylene copolymers, and chlorofluoroethylene-vinylidene fluoride copolymers. The nonpolar polymers include olefinic resins such as polyethylenes and polypropylenes. The separator can be formed according to a known or customary technique. The separator is not limited typically in thickness.

As is described above, the pressure-sensitive adhesive sheet of the present invention can fill (absorb) printed-ink bumps without causing bubbles and exhibits superior bump absorptivity even when applied to a member having such printed-ink bumps, because the sheet has an acrylic pressure-sensitive adhesive layer having a storage shear modulus at 23° C. of from $0.8 \times 10^5$ to $5.0 \times 10^5$ Pa. The pressure-sensitive adhesive sheet has a satisfactory adhesive strength at high temperatures and does not suffer from blistering and separation at high temperatures, because the acrylic pressure-sensitive adhesive layer includes an acrylic polymer formed from, as an essential monomer component, a monomer component forming a homopolymer having a glass transition temperature of −10° C. or higher. In addition, the pressure-sensitive adhesive sheet of the present invention also has satisfactory whitening resistance, because of having a moisture content of 0.65 percent by weight or more after storage in an environment of 60° C. and 95 percent relative humidity for 120 hours. For these reasons, the pressure-sensitive adhesive sheet of the present invention is usable for applications such as the lamination of optical members and the production of optical products. The pressure-sensitive adhesive sheet of the present invention, when used for such applications, gives products (e.g., touch panels) with beautiful finish, because the sheet less causes phenomena that can adversely affect the visibility and appearances of the products, such as formation of bubbles and gaps, and whitening.

As used herein the term "optical member" refers to a member having any of optical properties such as polarizability, photorefractivity, light scattering, light reflectivity, optical transparency, optical absorptivity, optical diffractive ability, optical rotatory power, and visibility. The optical member is not limited, as long as being a member having an optical property, but is exemplified by members constituting optical products such as display devices (image display devices) and input devices, or members for use in these devices (optical products). Exemplary optical members herein include polarizing plates, wave plates, retardation films, compensation films, brightness enhancing films, light guide panels, reflective films, anti-reflection films, transparent conductive films (e.g., ITO films), films with graphical design functions, decorative films, surface protective plates, prisms, lenses, color filters, transparent substrates, and members each including any of these as laminated. These are also generically referred to as "functional films." The terms "plates (panels)" and "films" include those in the forms of plates, films, and sheets. For example, "polarizing films" also include "polarizing plates" and "polarizing sheets." Likewise, the "functional films" also include "functional plates" and "functional sheets."

The display devices (image display devices) are typified by liquid crystal display devices, organic EL (electroluminescence) display devices, PDPs (plasma display panels), and electronic papers. The input devices are typified by touch panels.

The optical members are not limited in material, but exemplary members include members (e.g., the members in the form of sheet, film, or plate) made from acrylic resins, polycarbonate resins, poly(ethylene terephthalate)s, glass, and thin metal films, respectively. As used herein the term "optical member" also includes members for adding a graphical design function, or for protecting adherend display devices and input devices while maintaining their visibility, which are typified by films with graphical design functions, decorative films, and surface protective plates, as described above.

The pressure-sensitive adhesive sheet of the present invention, when controlling the amount of extracted (meth)acrylic acid ions within the specific range, can be satisfactorily less corrosive and is preferably usable particularly in the application to a thin metal film (thin metal film or thin metal oxide film). The thin metal film has only to be a thin film made from a metal, a metal oxide, or a mixture of them, but is typified by thin films of ITO (indium tin oxide), ZnO, SnO, and CTO (cadmium tin oxide), respectively. Though not critical, the thin metal film has a thickness of preferably from 100 to 2000 angstroms. The thin metal film such as an ITO film is typically provided on a PET film and used as a transparent conductive film. The pressure-sensitive adhesive sheet of the present invention, when to be applied to a thin metal film, is preferably used so that the surface of the acrylic pressure-sensitive adhesive layer in the present invention serves as an adhesive face facing the thin metal film.

An example of specific uses of the pressure-sensitive adhesive sheet of the present invention is a pressure-sensitive adhesive sheet for touch panels, which is used for the production of touch panels. Typically, the pressure-sensitive adhesive sheet of the present invention can be used typically for the lamination of a transparent conductive film bearing a thin ITO film or another thin metal film typically with a poly(methyl methacrylate) (PMMA) plate, a hard coat film, or a glass lens through the medium of the pressure-sensitive adhesive sheet in the production of capacitive touch panels. Though not limited, the resulting touch panels may be used in cellular phones of touch panel type.

When being a double-coated pressure-sensitive adhesive sheet, the pressure-sensitive adhesive sheet of the present invention may be applied to at least one side of a functional film of every kind to give a pressure-sensitive adhesive functional film having the functional film and, on at least one side thereof, the acrylic pressure-sensitive adhesive layer in the present invention. The functional film herein is as described above. The pressure-sensitive adhesive sheet of the present invention (double-coated pressure-sensitive adhesive sheet) for use in the pressure-sensitive adhesive functional film may be a substrate-less pressure-sensitive adhesive sheet or a substrate-supported pressure-sensitive adhesive sheet.

EXAMPLES

The present invention will be illustrated in further detail with reference to several working examples below. It should be noted, however, that these examples are never construed to limit the scope of the present invention. In the following description and in Table 1, amounts of "TAKENATE D110N" (solids content of 75 percent by weight) are indicated as amounts (part by weight) in terms of solids content of "TAKENATE D110N." Amounts of "KBM-403" and "EDP-300" are indicated as amounts (part by weight) of "KBM-403" and "EDP-300" themselves (the products themselves), respectively.

Example 1

In a separable flask were placed 69.7 parts by weight of 2-ethylhexyl acrylate (2EHA), 10 parts by weight of 2-methoxyethyl acrylate (MEA), 13 parts by weight of 2-hydroxyethyl acrylate (2HEA), 6 parts by weight of N-vinyl-2-pyrrolidone (NVP), and 1.3 parts by weight of N-hydroxyethylacrylamide (HEAA) as monomer components, 0.1 part by weight of 2,2'-azobisisobutyronitrile as a polymerization initiator, and 200 parts by weight of ethyl acetate as a polymerization solvent, followed by stirring for one hour with the introduction of nitrogen gas. After removing oxygen from the polymerization system in this manner, the mixture was raised in temperature to 63° C., reacted for 10 hours, diluted with ethyl acetate, and thereby yielded an acrylic polymer solution having a solids concentration of 30 percent by weight.

With reference to Table 1, a pressure-sensitive adhesive composition (solution) was prepared by adding, to 100 parts by weight of the acrylic polymer, 0.2 part by weight of an isocyanate crosslinking agent (trade name "TAKENATE D110N" supplied by Mitsui Chemicals Inc.) as a crosslinking agent, 0.15 part by weight of γ-glycidoxypropyltrimethoxysilane (trade name "KBM-403" supplied by Shin-Etsu Chemical Co., Ltd.) as a silane coupling agent, and 0.2 part by weight of a polyol being an adduct of ethylenediamine with propylene oxide (trade name "EDP-300" supplied by ADEKA CORPORATION) as a crosslinking promoter. Next, the pressure-sensitive adhesive composition (solution) was applied to a release-treated surface of a release liner (separator) (trade name "MRF75" supplied by Mitsubishi Plastics, Inc.) so as to have a dry thickness of 50 μm, dried by heating at 60° C. for one minute and at 155° C. for one minute each under normal atmospheric pressure, further aged at 23° C. for 72 hours, and thereby yielded a double-coated pressure-sensitive adhesive sheet (substrate-less double-coated pressure-sensitive adhesive sheet).

Example 2

A double-coated pressure-sensitive adhesive sheet (substrate-less double-coated pressure-sensitive adhesive sheet) including a pressure-sensitive adhesive layer having a thickness of 50 μm was obtained by the procedure of Example 1, except for using, as monomer components, 69.7 parts by weight of n-butyl acrylate (BA), 10 parts by weight of 2-methoxyethyl acrylate (MEA), 13 parts by weight of 2-hydroxyethyl acrylate (2HEA), 6 parts by weight of N-vinyl-2-pyrrolidone (NVP), and 1.3 parts by weight of N-hydroxyethylacrylamide (HEAA), and except for not using the silane coupling agent "KBM-403," as indicated in Table 1.

Example 3

A double-coated pressure-sensitive adhesive sheet (substrate-less double-coated pressure-sensitive adhesive sheet) including a pressure-sensitive adhesive layer having a thickness of 50 μm was obtained by the procedure of Example 1, except for using, as monomer components, 75 parts by weight of 2-ethylhexyl acrylate (2EHA), 11.5 parts by weight of 2-methoxyethyl acrylate (MEA), 5 parts by weight of 2-hydroxyethyl acrylate (2HEA), 7 parts by weight of N-vinyl-2-pyrrolidone (NVP), and 1.5 parts by weight of N-hydroxyethylacrylamide (HEAA), as indicated in Table 1.

Example 4

A double-coated pressure-sensitive adhesive sheet (substrate-less double-coated pressure-sensitive adhesive sheet) including a pressure-sensitive adhesive layer having a thickness of 50 μm was obtained by the procedure of Example 1, except for using, as monomer components, 70 parts by weight of 2-ethylhexyl acrylate (2EHA), 11.5 parts by weight of 2-methoxyethyl acrylate (MEA), 10 parts by weight of 2-hydroxyethyl acrylate (2HEA), 7 parts by weight of N-vinyl-2-pyrrolidone (NVP), and 1.5 parts by weight of N-hydroxyethylacrylamide (HEAA), as indicated in Table 1.

Example 5

A double-coated pressure-sensitive adhesive sheet (substrate-less double-coated pressure-sensitive adhesive sheet) including a pressure-sensitive adhesive layer having a thickness of 50 μm was obtained by the procedure of Example 1, except for using, as monomer components, 65 parts by weight of 2-ethylhexyl acrylate (2EHA), 11.5 parts by weight of 2-methoxyethyl acrylate (MEA), 15 parts by weight of 2-hydroxyethyl acrylate (2HEA), 7 parts by weight of N-vinyl-2-pyrrolidone (NVP), and 1.5 parts by weight of N-hydroxyethylacrylamide (HEAA), as indicated in Table 1.

Example 6

A double-coated pressure-sensitive adhesive sheet (substrate-less double-coated pressure-sensitive adhesive sheet) including a pressure-sensitive adhesive layer having a thickness of 50 μm was obtained by the procedure of Example 5, except for using "TAKENATE D110N" in an amount of 0.12 part by weight, as indicated in Table 1.

Example 7

A double-coated pressure-sensitive adhesive sheet (substrate-less double-coated pressure-sensitive adhesive sheet) including a pressure-sensitive adhesive layer having a thickness of 50 μm was obtained by the procedure of Example 5, except for using "TAKENATE D110N" in an amount of 0.45 part by weight, as indicated in Table 1.

Example 8

A double-coated pressure-sensitive adhesive sheet (substrate-less double-coated pressure-sensitive adhesive sheet)

including a pressure-sensitive adhesive layer having a thickness of 50 µm was obtained by the procedure of Example 1, except for using, as monomer components, 60 parts by weight of 2-ethylhexyl acrylate (2EHA), 11.5 parts by weight of 2-methoxyethyl acrylate (MEA), 15 parts by weight of 2-hydroxyethyl acrylate (2HEA), 7 parts by weight of N-vinyl-2-pyrrolidone (NVP), 1.5 parts by weight of N-hydroxyethylacrylamide (HEAA), and 5 parts by weight of acrylic acid (AA), as indicated in Table 1.

Comparative Example 1

A double-coated pressure-sensitive adhesive sheet (substrate-less double-coated pressure-sensitive adhesive sheet) including a pressure-sensitive adhesive layer having a thickness of 50 µm was obtained by the procedure of Example 1, except for using, as monomer components, 75 parts by weight of 2-ethylhexyl acrylate (2EHA), 24 parts by weight of n-butyl acrylate (BA), and 1 part by weight of 2-hydroxyethyl acrylate (2HEA), as indicated in Table 1.

Comparative Example 2

A double-coated pressure-sensitive adhesive sheet (substrate-less double-coated pressure-sensitive adhesive sheet) including a pressure-sensitive adhesive layer having a thickness of 50 µm was obtained by the procedure of Example 1, except for using, as monomer components, 26.5 parts by weight of n-butyl acrylate (BA), 50 parts by weight of ethyl acrylate (EA), 15 parts by weight of 2-hydroxyethyl acrylate (2HEA), 7 parts by weight of N-vinyl-2-pyrrolidone (NVP), and 1.5 parts by weight of N-hydroxyethylacrylamide (HEAA), as indicated in Table 1.

(Evaluations)

The double-coated pressure-sensitive adhesive sheets (acrylic pressure-sensitive adhesive layers) obtained in the examples and comparative examples, and the acrylic polymers constituting the double-coated pressure-sensitive adhesive sheets (acrylic pressure-sensitive adhesive layers) were examined on the evaluations given in Table 1. The measurement methods or evaluation methods are as follows. Measurement methods for the glass transition temperature (Tg) of the acrylic polymer, the gel fraction and the weight-average molecular weight of the sol fraction of the acrylic pressure-sensitive adhesive layer, and the moisture content of the pressure-sensitive adhesive sheet (double-coated pressure-sensitive adhesive sheet) are as mentioned above.

(1) Weight-average Molecular Weight and Molecular Weight Distribution

Acrylic polymers were obtained removing volatile components from the acrylic polymer solutions prepared in the examples and comparative examples. Each of the acrylic polymers was dissolved in a solution (eluent) of 10 mM LiBr and 10 mM phosphoric acid in DMF to give a solution having a concentration of the acrylic polymer of 2.0 g/L, and the solution was left stand overnight. Next, the solution was filtrated through a 0.45-µm membrane filter, the filtrate was subjected to a measurement through gel permeation chromatography (GPC) with an after-mentioned analyzer under after-mentioned measurement conditions. The weight-average molecular weight (Mw) and molecular weight distribution (Mw/Mn) of the acrylic polymer were calculated in terms of polystyrene standard. For verifying reproducibility, the measurement was performed two times (n=2).

GPC Analyzer
Analyzer: Trade name "HLC-8120GPC" (supplied by Tosoh Corporation)

GPC Measurement Conditions
Column: Trade names "TSKgel, SuperAWM-H, superAW4000, and superAW2500" (each supplied by Tosoh Corporation)
Column size: Each 6.0 mm in inner diameter by 150 mm
Eluent: 10 mM LiBr and 10 mM phosphoric acid in DMF
Flow rate: 0.4 mL/min.
Detector: Differential refractive index detector (RI)
Column temperature (measurement temperature): 40° C.
Sample volume: 20 µL (2) Storage Shear Modulus A series of laminates as measurement samples each including multiple plies of a sample acrylic pressure-sensitive adhesive layer and having a thickness of about 1.5 mm was prepared by laminating multiple plies of each double-coated pressure-sensitive adhesive sheet (acrylic pressure-sensitive adhesive layer) obtained in the examples and comparative examples.

The measurement samples were each subjected to a measurement at temperatures of from −70° C. to 200° C. at a rate of temperature rise of 5° C. per minute at a frequency of 1 Hz with the "Advanced Rheometric Expansion System (ARES)" supplied by Rheometric Scientific F.E. (now TA Instruments) in a shear mode, based on which storage shear moduli at 23° C. were calculated. The results are indicated in "Storage modulus" in Table 1.

(3) Amount of Extracted (Meth)acrylic Acid Ions

A PET film ("LUMIRROR S10" supplied by Toray Industries Inc., 25 µm thick) was affixed to the surface of the pressure-sensitive adhesive layer in each of the double-coated pressure-sensitive adhesive sheets obtained in the examples and comparative examples, from which a sheet piece of a size of 10 cm wide by 10 cm long was cut out. A series of test pieces was then prepared by removing the release liner from the sheet piece to expose one adhesive face alone (exposed area of the adhesive face: 100 cm$^2$).

Next, the test pieces were placed in pure water (50 ml) at a temperature of 100° C., followed by boiling for 45 minutes for boiling extraction, to give extracts.

Next, the total amounts (unit: ng) of acrylic acid ions and methacrylic acid ions in the above-obtained extracts were measured by ion chromatography, from which the total amounts (unit: ng/cm$^2$) of acrylic acid ions and methacrylic acid ions per unit area of the adhesive face (exposed adhesive face) of the test pieces were calculated. When the amount of extracted (meth)acrylic acid ions is less than the detection limit (detection limit: 2.5 ng), it is indicated as "ND" in Table 1.

[Measurement Conditions for Ion Chromatography]
Analyzer: DX-320, Dionex Corporation (now subsidiary of Thermo Fisher Scientific Inc.)
Separation column: Ion Pac AS15 (4 mm by 250 mm)
Guard column: Ion Pac AG15 (4 mm by 50 mm)
Suppressor: ASRS-ULTRA (external mode, 100 mA)
Detector: Electroconductivity detector
Eluent: 7 mM KOH (0 to 20 min.)
    45 mM KOH (20 to 30 min.)
    (using Eluent Generator EG40)
Eluent flow rate: 1.0 ml per minute
Sample volume: 250 µl (4) Presence or Absence of Blistering/Separation (High-temperature Bonding Reliability)

An adhesive face (one adhesive face) of each of the double-coated pressure-sensitive adhesive sheets obtained in the examples and comparative examples was laminated to a side of an electroconductive film (trade name "ELECRYSTA V270L-THMP" supplied by Nitto Denko Corporation) bearing an ITO film and thereby yielded a film piece of a size of 100 mm wide by 100 mm long. The electroconductive film had been treated at 140° C. for 60 minutes.

The release liner was removed from the film piece to expose an adhesive face (the other adhesive face), and the exposed adhesive face of the film piece was laminated and affixed to a soda-lime glass (1 mm thick), and thereby yielded a series of sample pieces (test piece) having a layer structure of "(electroconductive film)/(acrylic pressure-sensitive adhesive layer (pressure-sensitive adhesive sheet))/(soda-lime glass)."

The sample pieces were placed in an oven at 85° C., followed by a heat treatment for 5 hours as a thermal stability test. After the thermal stability test, the adhesive interfaces (interfaces each between the acrylic pressure-sensitive adhesive layer and the electroconductive film) of the sample pieces were visually observed. A sample having neither bubble (blister) nor gap at all was evaluated as "Good" (without blistering/separation, good high-temperature bonding reliability), whereas a sample having any of bubbles (blisters) and gaps, even in a limited amount was evaluated as "Poor" (with blistering/separation, poor high-temperature bonding reliability). The results are indicated in "High-temperature bonding reliability" in Table 1.

(5) Bump Absorptivity

A PET film (size: 60 mm long by 42 mm wide) having a frame-like black printed layer as illustrated in FIG. 1 was prepared by applying black printing of 4 μm thick to one side of a PET film (trade name "A4100" supplied by Toyobo Co. Ltd., 188 μm thick) six times by screen process printing. The printed layer has a thickness of 24 μm and outside dimensions of 60 mm long by 42 mm wide.

Next, an adhesive face (one adhesive face) of each of the double-coated pressure-sensitive adhesive sheets (size: 60 mm long by 42 mm wide) obtained in the examples and comparative examples was laminated onto the black-printed-layer-bearing surface of the PET film using a laminator at a linear load of 5 kg/cm.

Figure 2:
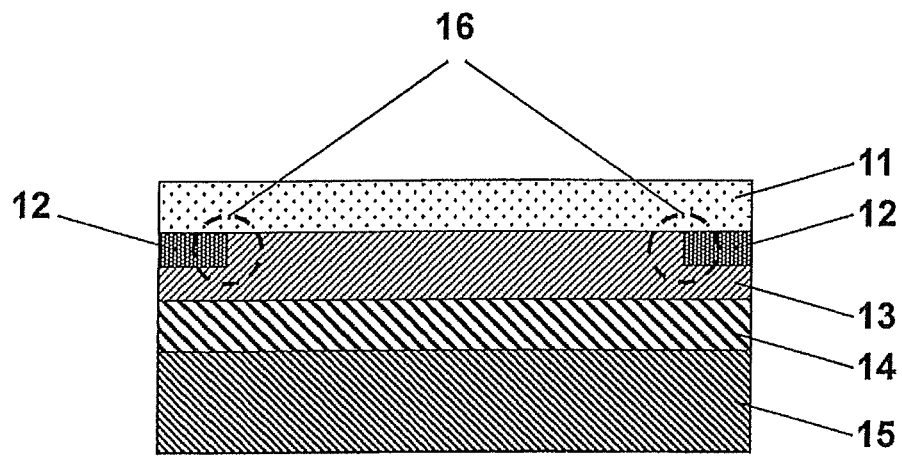
FIG. 2 is a schematic diagram (cross-sectional view) of a measurement sample used in the evaluation of bump absorptivity in the working examples.

Next, the release liner was removed from the laminate of the double-coated pressure-sensitive adhesive sheet and the PET film having the black printed layer to expose an adhesive face, and the exposed adhesive face of the laminate was applied onto a PET film (trade name "A4300" supplied by Toyobo Co. Ltd., 125 μm thick) (size: 60 mm long by 42 mm wide) using a laminator at a linear load of 5 kg/cm, which PET film had been laminated on a glass substrate. Thus, a series of measurement samples (see FIG. 2) was prepared.

The measurement samples were treated in an autoclave under conditions of 50° C. and 0.5 MPa for 15 minutes, and the presence or absence of bubbles and gaps in the bump region was visually observed from the glass substrate side. A sample having neither bubble nor gap at all in the bump region was evaluated as "Good" (good bump absorptivity), whereas a sample having any of bubbles and gaps even in a limited amount was evaluated as "Poor" (poor bump absorptivity). The results are indicated in "Bump absorptivity" in Table 1.

(6) Presence or Absence of High-humidity Hazing (Whitening Resistance)

One adhesive face of each of the double-coated pressure-sensitive adhesive sheets (acrylic pressure-sensitive adhesive layers) obtained in the examples and comparative examples, from which the release liner had been removed, was affixed to a glass slide (trade name "MICRO SLIDE GLASS," product number "S" supplied by Matsunami Glass Ind., Ltd., having a thickness of 1.3 mm and a haze of 0.1%, Suienma), whereas the other adhesive face was affixed to a PET film (trade name "A4100" supplied by Toyobo Co. Ltd., having a thickness of 100 μm and a haze of 0.6%), and thereby yielded a series of test pieces having a structure of "(glass slide)/(acrylic pressure-sensitive adhesive layer)/(PET film)." The hazes of the test pieces were measured in an environment of 23° C. and 50 percent relative humidity with a hazemeter (trade name "HM-150" supplied by Murakami Color Research Laboratory).

Next, the test pieces were stored in an environment of 60° C. and 95 percent relative humidity (in a hot and humid environment) for 120 hours, recovered to an environment of 23° C. and 50 percent relative humidity, and the hazes of the test pieces immediately after the recovery were measured by the above procedure. The hazes of each test piece before and after the storage in an environment of 60° C. and 95 percent relative humidity were compared to each other, and an increase in haze was calculated by subtracting the haze before the storage in a hot and humid environment from the haze after the storage in a hot and humid environment [(Haze after the storage in a hot and humid environment)−(Haze before the storage in a hot and humid environment)]. A sample having an increase in haze of less than 1.0% (percentage point) was evaluated as "Good" (without high-humidity hazing, good whitening resistance), whereas a sample having an increase in haze after the storage with respect to that before the storage of 1.0% (percentage point) or more was evaluated as "Poor" (with high-humidity hazing, poor whitening resistance). The results are indicated in "Whitening resistance" in Table 1.

(7) Less-corrosive Properties (ITO Resistance Change)

A PET film (trade name "LUMIRROR S-10 #25" supplied by Toray Industries Inc., 25 μm thick) was laminated onto an adhesive face (one adhesive face) of each of the double-coated pressure-sensitive adhesive sheets obtained in the examples and comparative examples, cut to a size of 20 mm wide by 50 mm long, and thereby yielded a series of test pieces.

Figure 3:
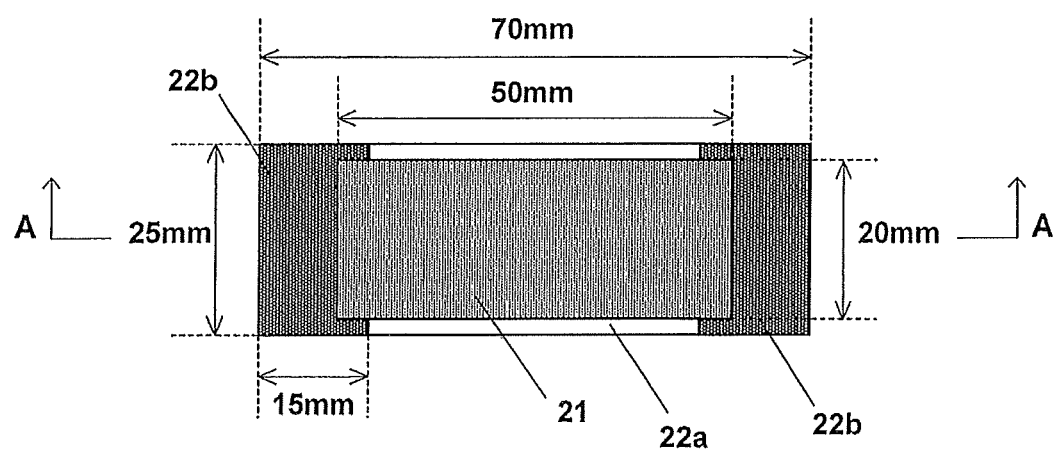
FIG. 3 is a schematic diagram (plan view) illustrating a resistance-measurement sample used in the evaluation of less-corrosive properties in the working examples.
Figure 4:
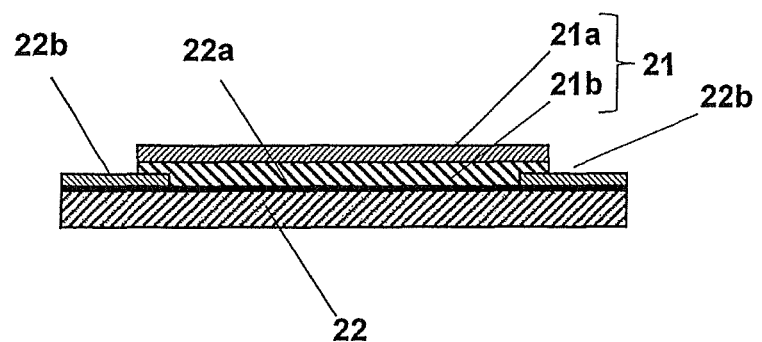
FIG. 4 is a schematic diagram (cross-sectional view taken along the line A-A in FIG. 3) illustrating the resistance-measurement sample used in the evaluation of less-corrosive properties in the working examples.

With reference to FIGS. 3 and 4, a silver paste was applied each in a width of 15 mm to both lateral ends of an electroconductive PET film 22 (trade name "ELECRYSTA V-270 TFMP" supplied by Nitto Denko Corporation) (size: 70 mm long by 25 mm wide). An adhesive face of the test piece 21, from which the release liner had been removed, was laminated to the electroconductive face (surface 22a bearing an ITO film) of the electroconductive PET film 22 and thereby yielded laminates (laminates of the test piece 21 and the electroconductive PET film 22) as resistance-measurement samples. These were left stand in an environment of 23° C. for 24 hours, and whose resistance was measured and defined as an "resistance immediately after application." Next, the laminates were left stand in an environment of 60° C. and 95 percent relative humidity for 168 hours, and whose resistance was measured and defined as a "resistance after exposure to moist and heat."

The resistances were measured with a "mΩ HiTESTER 3540" supplied by HIOKI E.E. CORPORATION while bringing electrodes into contact with silver-paste regions 22b at both lateral ends of the laminate.

A rate of resistance change was calculated from the above-measured "resistance immediately after application" and "resistance after exposure to moist and heat" according to the following expression:

Rate of resistance change (%)=[{((Resistance after exposure to moist and heat)−(Resistance immediately after application))/(Resistance immediately after application)}×100]

A sample having a above-determined rate of resistance change of less than 110% was evaluated as "Good" (with a small increase in resistance due to moist and heat (good less-corrosive properties)), whereas a sample having a rate of resistance change of 110% or more was evaluated as "Poor" (with a large increase in resistance due to moist and heat (poor less-corrosive properties)). The results are indicated in "Less-corrosive properties" in Table 1.

(8) Difference in Haze

One adhesive face of each of the double-coated pressure-sensitive adhesive sheets (acrylic pressure-sensitive adhesive layers) obtained in the examples and comparative examples, from which the release liner had been removed, was affixed to a glass slide (having a total light transmittance of 91.8% and a haze of 0.4%), whereas the other adhesive face was affixed to a PET film (trade name "A4100" supplied by Toyobo Co. Ltd., having a thickness of 100 μm and a haze of 0.6%), and thereby yielded a series of test pieces having a structure of "(glass slide)/(acrylic pressure-sensitive adhesive layer)/(PET film)." The hazes (hazes before the storage in an environment of 60° C. and 95 percent relative humidity for 250 hours) of the test pieces were measured in an environment of 23° C. and 50 percent relative humidity with a hazemeter (trade name "HM-150" supplied by Murakami Color Research Laboratory). The results are indicated in Table 2.

Next, the test pieces were placed in a thermo-hygrostat chamber (trade name "SH-261" supplied by ESPEC Corporation) having a preset in-chamber atmosphere of 60° C. and 95 percent relative humidity, stored therein for 250 hours, and then recovered to an environment of 23° C. and 50 percent relative humidity. On the test pieces, a haze immediately after the recovery to an environment of 23° C. and 50 percent relative humidity, a haze 30 minutes after the recovery, a haze one hour after the recovery, a haze 3 hours after the recovery, and a haze 6 hours after the recovery were measured by the above procedure. The results are indicated in Table 2.

Based on these data, differences in haze (haze difference) between each of the hazes after the storage in an environment of 60° C. and 95 percent relative humidity (immediately, 30 minutes, one hour, 3 hours, and 6 hours after the recovery to an environment of 23° C. and 50 percent relative humidity) and the haze before the storage in an environment of 60° C. and 95 percent relative humidity were calculated. The results are indicated in Table 2.

TABLE 1

|  |  | Ex. 1 | Ex. 2 | Ex. 3 | Ex. 4 | Ex. 5 |
|---|---|---|---|---|---|---|
| Monomer formulation of acrylic polymer (part by weight) | 2EHA | 69.7 | — | 75 | 70 | 65 |
|  | BA | — | 69.7 | — | — | — |
|  | MEA | 10 | 10 | 11.5 | 11.5 | 11.5 |
|  | 2HEA | 13 | 13 | 5 | 10 | 15 |
|  | NVP | 6 | 6 | 7 | 7 | 7 |
|  | HEAA | 1.3 | 1.3 | 1.5 | 1.5 | 1.5 |
|  | AA | — | — | — | — | — |
|  | EA | — | — | — | — | — |
| Weight-average molecular weight Mw of acrylic polymer |  | $120 \times 10^4$ | — | $122 \times 10^4$ | $123 \times 10^4$ | $101 \times 10^4$ |
| Molecular weight distribution Mw/Mn of acrylic polymer |  | 8.2 | 8.7 | 7.9 | 8.0 | 8.3 |
| Tg (° C.) of acrylic polymer |  | −55 | −44 | −58 | −55 | −53 |
| Additives (part by weight) per 100 parts by weight of acrylic polymer | TAKENATE D110N | 0.2 | 0.2 | 0.2 | 0.2 | 0.2 |
|  | KBM-403 | 0.15 | — | 0.15 | 0.15 | 0.15 |
|  | EDP-300 | 0.2 | 0.2 | 0.2 | 0.2 | 0.2 |
| Thickness of pressure-sensitive adhesive layer (μm) |  | 50 | 50 | 50 | 50 | 50 |
| Gel fraction of pressure-sensitive adhesive layer (%) |  | 60 | 60 | 61 | 60 | 60 |
| Mw of sol fraction of pressure-sensitive adhesive layer |  | $31 \times 10^4$ | $35 \times 10^4$ | $33 \times 10^4$ | $33 \times 10^4$ | $31 \times 10^4$ |
| High-temperature bonding reliability |  | Good | Good | Good | Good | Good |
| Storage shear modulus (23° C.) (×$10^5$ Pa) |  | 1.1 | 3.8 | 0.85 | 1.0 | 1.3 |
| Bump absorptivity |  | Good | Good | Good | Good | Good |
| Moisture content (%) |  | 1.0 | 1.1 | 0.65 | 0.85 | 1.2 |
| Whitening resistance |  | Good | Good | Good | Good | Good |
| Amount of extracted (meth)acrylic acid ions (ng/cm$^2$) |  | ND | ND | ND | ND | ND |
| Less-corrosive properties |  | Good | Good | Good | Good | Good |
| Rate of resistance change |  | 0% (no increase) | 0% (no increase) | 0% (no increase) | 0% (no increase) | 0% (no increase) |

|  |  | Ex. 6 | Ex. 7 | Ex. 8 | Com. Ex. 1 | Com. Ex. 2 |
|---|---|---|---|---|---|---|
| Monomer formulation of acrylic polymer (part by weight) | 2EHA | 65 | 65 | 60 | 75 | — |
|  | BA | — | — | — | 24 | 26.5 |
|  | MEA | 11.5 | 11.5 | 11.5 | — | — |
|  | 2HEA | 15 | 15 | 15 | 1 | 15 |
|  | NVP | 7 | 7 | 7 | — | 7 |
|  | HEAA | 1.5 | 1.5 | 1.5 | — | 1.5 |
|  | AA | — | 5 | — | — | — |
|  | EA | — | — | — | — | 50 |
| Weight-average molecular weight Mw of acrylic polymer |  | $101 \times 10^4$ | $101 \times 10^4$ | $108 \times 10^4$ | $90 \times 10^4$ | $95 \times 10^4$ |
| Molecular weight distribution Mw/Mn of acrylic polymer |  | 8.3 | 8.3 | 9.0 | 5.7 | 7.7 |
| Tg (° C.) of acrylic polymer |  | −53 | −53 | −48 | −66 | −26 |
| Additives (part by weight) per 100 parts by weight of acrylic polymer | TAKENATE D110N | 0.12 | 0.45 | 0.2 | 0.2 | 0.2 |
|  | KBM-403 | 0.15 | 0.15 | 0.15 | 0.15 | 0.15 |
|  | EDP-300 | 0.2 | 0.2 | 0.2 | 0.2 | 0.2 |
| Thickness of pressure-sensitive adhesive layer (μm) |  | 50 | 50 | 50 | 50 | 50 |
| Gel fraction of pressure-sensitive adhesive layer (%) |  | 45 | 80 | 61 | 60 | 60 |
| Mw of sol fraction of pressure-sensitive adhesive layer |  | $45 \times 10^4$ | $19 \times 10^4$ | $34 \times 10^4$ | $37 \times 10^4$ | $32 \times 10^4$ |
| High-temperature bonding reliability |  | Good | Good | Good | Poor | Good |

TABLE 1-continued

|  |  |  |  |  |  |
|---|---|---|---|---|---|
| Storage shear modulus (23° C.) (×10⁵ Pa) | 1.3 | 1.3 | 1.8 | 1.3 | 6.9 |
| Bump absorptivity | Good | Good | Good | Good | Poor (bubbles) |
| Moisture content (%) | 1.2 | 1.2 | 1.4 | 0.55 | 1.3 |
| Whitening resistance | Good | Good | Good | Poor | Good |
| Amount of extracted (meth)acrylic acid ions (ng/cm²) | ND | ND | 39 | ND | ND |
| Less-corrosive properties | Good | Good | Poor | Good | Good |
| Rate of resistance change | 0% (no increase) | 0% (no increase) | 50% (increase) | 0% (no increase) | 0% (no increase) |

TABLE 2

|  |  | Ex. 1 | Ex. 2 | Ex. 3 | Ex. 4 | Ex. 5 | Ex. 6 | Ex. 7 | Ex. 8 | Com. Ex. 1 | Com. Ex. 2 |
|---|---|---|---|---|---|---|---|---|---|---|---|
| Haze (%) before storage in environment of 60° C. and 95% RH for 250 hrs | | 0.9 | 0.9 | 0.9 | 0.9 | 0.9 | 0.9 | 0.9 | 0.9 | 0.9 | 0.9 |
| Haze (%) after storage in environment of 60° C. and 95% RH for 250 hrs | Immediately after recovery | 1.7 | 1.5 | 4.2 | 2.9 | 1.5 | 2.0 | 1.4 | 1.3 | 15.3 | 1.4 |
| | 30 minutes after recovery | 1.4 | 1.3 | 2.7 | 1.6 | 1.2 | 1.4 | 1.2 | 1.1 | 10.7 | 1.2 |
| | 1 hr after recovery | 1.3 | 1.2 | 1.4 | 1.4 | 1.2 | 1.3 | 1.1 | 1.1 | 3.6 | 1.0 |
| | 3 hrs after recovery | 1.3 | 1.2 | 1.3 | 1.2 | 1.1 | 1.2 | 1.1 | 1.1 | 2.7 | 1.0 |
| | 6 hrs after recovery | 1.1 | 1.1 | 1.1 | 1.1 | 1.1 | 1.1 | 1.1 | 1.0 | 2.3 | 1.0 |
| Difference (%) in haze | [Immediately after recovery]-[Before storage] | 0.8 | 0.6 | 3.3 | 2.0 | 0.6 | 1.1 | 0.5 | 0.4 | 14.4 | 0.5 |
| | [Min. after recovery]-[Before storage] | 0.5 | 0.4 | 1.8 | 0.7 | 0.3 | 0.5 | 0.3 | 0.2 | 9.8 | 0.3 |
| | [1 Hr after recovery]-[Before storage] | 0.4 | 0.3 | 0.5 | 0.5 | 0.3 | 0.4 | 0.2 | 0.2 | 2.7 | 0.1 |
| | [3 Hrs after recovery]-[Before storage] | 0.4 | 0.3 | 0.4 | 0.3 | 0.2 | 0.3 | 0.2 | 0.2 | 1.8 | 0.1 |
| | [6 Hrs after recovery]-[Before storage] | 0.2 | 0.2 | 0.2 | 0.2 | 0.2 | 0.2 | 0.2 | 0.1 | 1.4 | 0.1 |

As is evident from the results indicated in Tables 1 and 2, the pressure-sensitive adhesive sheets of the present invention (Examples) excelled in high-temperature bonding reliability and whitening resistance and had superior bump absorptivity. When stored under hot and humid conditions and recovered to an environment of 23° C. and 50 percent relative humidity, the pressure-sensitive adhesive sheets had small increases in haze after the recovery (immediately, 30 minutes, one hour, 3 hours, and 6 hours after the recovery) with respect to the haze before the storage.

In contrast, a sample (Comparative Example 1), which does not contain a monomer forming a homopolymer with a Tg of −10° C. or higher as a monomer component for constituting an acrylic polymer and has an excessively low moisture content after storage in an environment of 60° C. and 95 percent relative humidity for 120 hours, had poor high-temperature bonding reliability and poor whitening resistance. A sample (Comparative Example 2) having an excessively high storage shear modulus had poor bump absorptivity.

Abbreviations in Table 1 are as follows.
2EHA: 2-Ethylhexyl acrylate
BA: n-Butyl acrylate
MEA: 2-Methoxyethyl acrylate
2HEA: 2-Hydroxyethyl acrylate
NVP: N-Vinyl-2-pyrrolidone
HEAA: N-Hydroxyethylacrylamide
AA: Acrylic acid
EA: Ethyl acrylate
TAKENATE D110N: Isocyanate crosslinking agent supplied by Mitsui Chemicals Inc.
KBM-403: γ-Glycidoxypropyltrimethoxysilane supplied by Shin-Etsu Chemical Co., Ltd.
EDP-300: Polyol as an adduct of ethylenediamine with propylene oxide, supplied by ADEKA CORPORATION Industrial Applicability The optical pressure-sensitive adhesive sheets according to the present invention are used typically for the lamination of optical members and for the production of optical products. The pressure-sensitive adhesive sheets of the present invention, when used in these applications, give products (e.g., touch panels) with beautiful finish, because the optical pressure-sensitive adhesive sheets less cause phenomena (e.g., the formation of bubbles and gaps, and whitening) which may adversely affect the visibility and appearances of the products.

REFERENCE SIGNS LIST

11 PET film
12 black printed layer
13 double-coated pressure-sensitive adhesive sheet (acrylic pressure-sensitive adhesive layer)
14 PET film
15 glass substrate
16 bump region
21 test piece
21a PET film
21b double-coated pressure-sensitive adhesive sheet
22 electroconductive PET film
22a surface of electroconductive PET film bearing ITO film
22b silver paste-coated region of electroconductive PET film

The invention claimed is:

1. An optical pressure-sensitive adhesive sheet comprising an acrylic pressure-sensitive adhesive layer and having a moisture content of 0.65 percent by weight or more after storage in an environment of 60° C. and 95 percent relative humidity for 120 hours, the acrylic pressure-sensitive adhesive layer containing an acrylic polymer and having a storage shear modulus at 23° C. of from $0.8 \times 10^5$ to $5.0 \times 10^5$ Pa, and the acrylic polymer being formed from, as an essential monomer component, a monomer forming a homopolymer with a glass transition temperature of −10° C. or higher,
    wherein the acrylic polymer is formed from monomer components containing a hydroxyl-containing (meth) acrylic ester in a content of from 13 to 35 percent by weight based on the total amount (100 percent by weight) of the monomer components constituting the acrylic polymer.

2. The optical pressure-sensitive adhesive sheet according to claim 1, wherein the total amount, as measured through ion chromatography, of acrylic acid ions and methacrylic acid ions extracted from the optical pressure-sensitive adhesive sheet with pure water under conditions of 100° C. for 45 minutes is 20 ng/cm² or less per unit area (square centimeter; cm²) of the acrylic pressure-sensitive adhesive layer.

3. The optical pressure-sensitive adhesive sheet according to claim 1, wherein the acrylic pressure-sensitive adhesive layer has a gel fraction of from 40% to 95%.

4. The optical pressure-sensitive adhesive sheet according to claim 1, wherein, when the optical pressure-sensitive adhesive sheet is stored in an environment of 60° C. and 95 percent relative humidity for 250 hours and recovered to an environment of 23° C. and 50 percent relative humidity, the optical pressure-sensitive adhesive sheet has differences of each less than 5% between a haze immediately after the recovery and a haze before the storage in an environment of 60° C. and 95 percent relative humidity for 250 hours, between a haze 30 minutes after the recovery and the haze before the storage, between a haze one hour after the recovery and the haze before the storage, between a haze 3 hours after the recovery and the haze before the storage, and between a haze 6 hours after the recovery and the haze before the storage, respectively.

5. The optical pressure-sensitive adhesive sheet according to claim 1, wherein the acrylic polymer is formed from monomer components containing an amide compound in a content of from 5 to 20 percent by weight based on the total amount (100 percent by weight) of the monomer components constituting the acrylic polymer, the amide compound having a polymerizable functional group and being represented by following Formula (I):
[Chem. 1]

wherein $R^1$, $R^2$, and $R^3$ are each independently hydrogen atom or a monovalent organic group, or arbitrary two of $R^1$, $R^2$, and $R^3$ are bound to each other to form a cyclic structure, and the other one is a monovalent organic group.

6. The optical pressure-sensitive adhesive sheet according to claim 2, wherein the acrylic pressure-sensitive adhesive layer has a gel fraction of from 40% to 95%.

7. The optical pressure-sensitive adhesive sheet according to claims 2, wherein, when the optical pressure-sensitive adhesive sheet is stored in an environment of 60° C. and 95 percent relative humidity for 250 hours and recovered to an environment of 23° C. and 50 percent relative humidity, the optical pressure-sensitive adhesive sheet has differences of each less than 5% between a haze immediately after the recovery and a haze before the storage in an environment of 60° C. and 95 percent relative humidity for 250 hours, between a haze 30 minutes after the recovery and the haze before the storage, between a haze one hour after the recovery and the haze before the storage, between a haze 3 hours after the recovery and the haze before the storage, and between a haze 6 hours after the recovery and the haze before the storage, respectively.

8. The optical pressure-sensitive adhesive sheet according to claims 3, wherein, when the optical pressure-sensitive adhesive sheet is stored in an environment of 60° C. and 95 percent relative humidity for 250 hours and recovered to an environment of 23° C. and 50 percent relative humidity, the optical pressure-sensitive adhesive sheet has differences of each less than 5% between a haze immediately after the recovery and a haze before the storage in an environment of 60° C. and 95 percent relative humidity for 250 hours, between a haze 30 minutes after the recovery and the haze before the storage, between a haze one hour after the recovery and the haze before the storage, between a haze 3 hours after the recovery and the haze before the storage, and between a haze 6 hours after the recovery and the haze before the storage, respectively.

9. The optical pressure-sensitive adhesive sheet according to claims 6, wherein, when the optical pressure-sensitive adhesive sheet is stored in an environment of 60° C. and 95 percent relative humidity for 250 hours and recovered to an environment of 23° C. and 50 percent relative humidity, the optical pressure-sensitive adhesive sheet has differences of each less than 5% between a haze immediately after the recovery and a haze before the storage in an environment of 60° C. and 95 percent relative humidity for 250 hours, between a haze 30 minutes after the recovery and the haze before the storage, between a haze one hour after the recovery and the haze before the storage, between a haze 3 hours after the recovery and the haze before the storage, and between a haze 6 hours after the recovery and the haze before the storage, respectively.

10. The optical pressure-sensitive adhesive sheet according to claims 2, wherein the acrylic polymer is formed from monomer components containing an amide compound in a content of from 5 to 20 percent by weight based on the total amount (100 percent by weight) of the monomer components constituting the acrylic polymer, the amide compound having a polymerizable functional group and being represented by following Formula (I):
[Chem. 1]

wherein $R^1$, $R^2$, and $R^3$ are each independently hydrogen atom or a monovalent organic group, or arbitrary two of $R^1$, $R^2$, and $R^3$ are bound to each other to form a cyclic structure, and the other one is a monovalent organic group.

11. The optical pressure-sensitive adhesive sheet according to claims 3, wherein the acrylic polymer is formed from monomer components containing an amide compound in a content of from 5 to 20 percent by weight based on the total amount (100 percent by weight) of the monomer components constituting the acrylic polymer, the amide compound having a polymerizable functional group and being represented by following Formula (I):
[Chem. 1]

wherein $R^1$, $R^2$, and $R^3$ are each independently hydrogen atom or a monovalent organic group, or arbitrary two of $R^1$, $R^2$, and $R^3$ are bound to each other to form a cyclic structure, and the other one is a monovalent organic group.

12. The optical pressure-sensitive adhesive sheet according to claims 4, wherein the acrylic polymer is formed from monomer components containing an amide compound in a content of from 5 to 20 percent by weight based on the total amount (100 percent by weight) of the monomer components constituting the acrylic polymer, the amide compound having a polymerizable functional group and being represented by following Formula (I):
[Chem. 1]

wherein $R^1$, $R^2$, and $R^3$ are each independently hydrogen atom or a monovalent organic group, or arbitrary two of $R^1$, $R^2$, and $R^3$ are bound to each other to form a cyclic structure, and the other one is a monovalent organic group.

* * * * *